United States Patent
Maruyama

(10) Patent No.: US 11,411,447 B2
(45) Date of Patent: Aug. 9, 2022

(54) AXIAL GAP MOTOR

(71) Applicant: SEIKO EPSON CORPORATION, Tokyo (JP)

(72) Inventor: Hidenobu Maruyama, Azumino (JP)

(73) Assignee: SEIKO EPSON CORPORATION, Tokyo (JP)

(*) Notice: Subject to any disclaimer, the term of this patent is extended or adjusted under 35 U.S.C. 154(b) by 24 days.

(21) Appl. No.: 16/945,958

(22) Filed: Aug. 3, 2020

(65) Prior Publication Data
US 2021/0044162 A1    Feb. 11, 2021

(30) Foreign Application Priority Data
Aug. 9, 2019    (JP) .............................. JP2019-147286

(51) Int. Cl.
| | | |
|---|---|---|
| H02K 1/18 | (2006.01) | |
| H02K 1/14 | (2006.01) | |
| H02K 1/12 | (2006.01) | |
| H02K 1/2793 | (2022.01) | |
| H02K 21/24 | (2006.01) | |

(52) U.S. Cl.
CPC .............. *H02K 1/182* (2013.01); *H02K 1/12* (2013.01); *H02K 1/146* (2013.01); *H02K 21/24* (2013.01); *H02K 1/2793* (2013.01)

(58) Field of Classification Search
None
See application file for complete search history.

(56) References Cited

U.S. PATENT DOCUMENTS

| | | | | |
|---|---|---|---|---|
| 8,736,135 B2 * | 5/2014 | Asano | .................... | H02K 1/148 |
| | | | | 310/216.058 |
| 8,917,007 B2 * | 12/2014 | Matsuzaki | ............ | F04D 13/064 |
| | | | | 310/216.007 |
| 2019/0229565 A1 | 7/2019 | Masuda | | |

FOREIGN PATENT DOCUMENTS

| | | | | | |
|---|---|---|---|---|---|
| EP | 1536542 A1 | * | 6/2005 | ............. | H02K 3/522 |
| JP | 2009296825 A | | 12/2009 | | |
| JP | 2010017072 A | * | 1/2010 | ............. | H02K 1/148 |
| JP | 2012023879 A | * | 2/2012 | | |
| JP | 2016208795 A | | 12/2016 | | |
| JP | 2018061341 A | | 4/2018 | | |

OTHER PUBLICATIONS

Machine Translation of JP 2010017072 A (Year: 2010).*
Machine Translation of JP 2012023879 A (Year: 2012).*

* cited by examiner

*Primary Examiner* — Quyen P Leung
*Assistant Examiner* — Christopher Stephen Schaller
(74) *Attorney, Agent, or Firm* — Gang Yu

(57) ABSTRACT

In an axial gap motor, a rotor is rotatably supported and a stator is placed to face the rotor with a gap in a first direction parallel to a shaft of the rotation. A core of the stator is formed by stacking of thin plates that can be penetrated by magnetic flux in a second direction orthogonal to the first direction. A plurality of thus formed cores are fixed to a yoke. Here, each of the plurality of cores includes a plurality of fitting portions in positions at a side facing the yoke, and the yoke includes a plurality of attachment portions corresponding to the plurality of fitting portions of the core in positions in which each core is fixed.

6 Claims, 21 Drawing Sheets

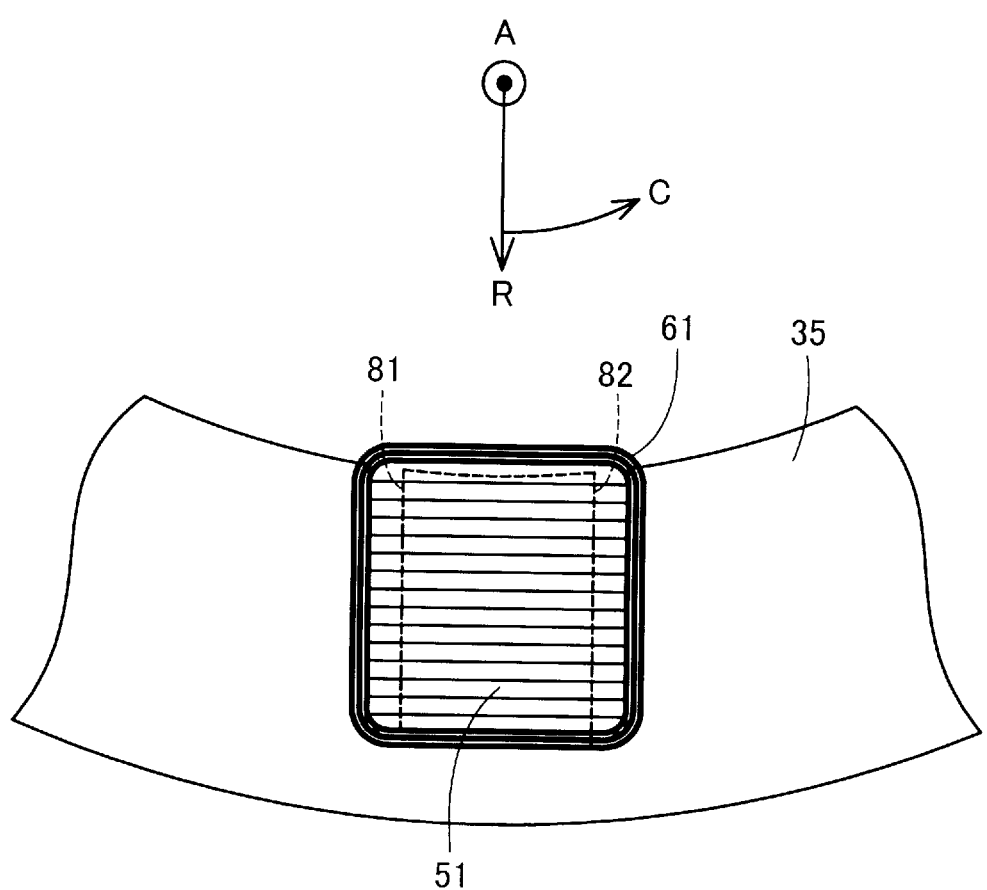

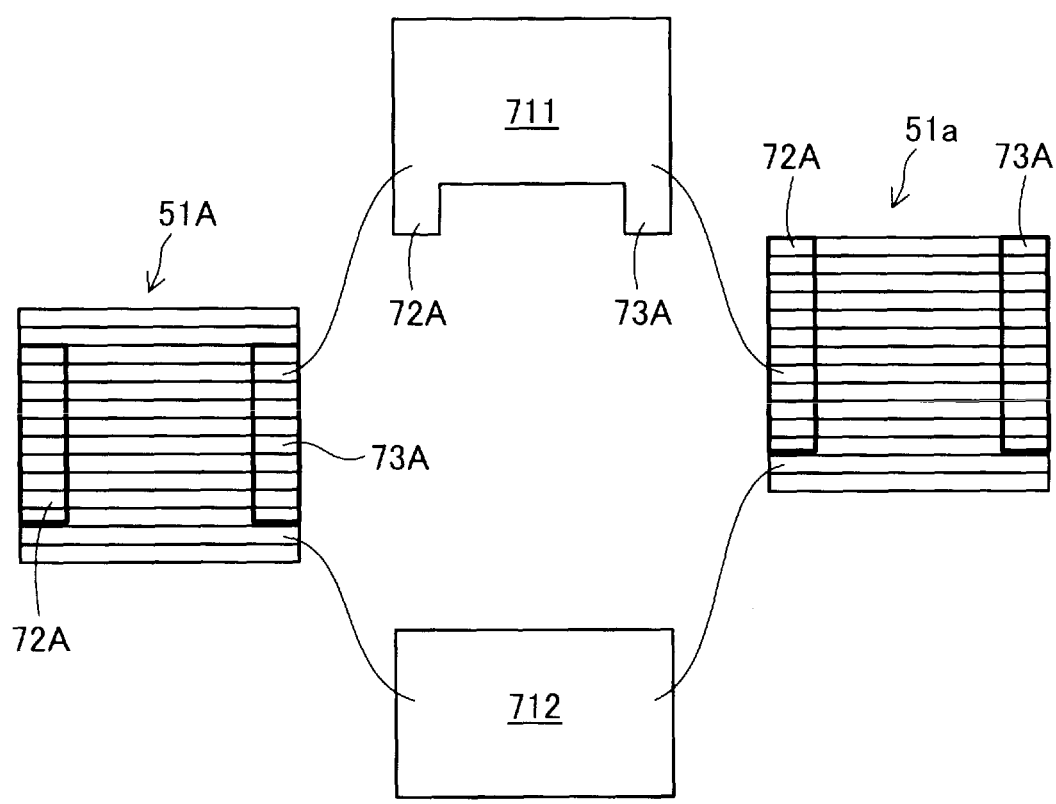

AXIAL GAP MOTOR

The present application is based on, and claims priority from JP Application Serial Number 2019-147286, filed Aug. 9, 2019, the disclosure of which is hereby incorporated by reference herein in its entirety.

BACKGROUND

1. Technical Field

The present disclosure relates to an axial gap motor.

2. Related Art

An axial gap motor has a gap between a stator and a rotor forming rotational magnetic flux in a rotation axial direction of the motor. The axial gap motor may have a larger core and easily form a thin motor with large output torque, however, it is harder to manufacture the core around which a winding coil (coil) is wound for formation of magnetic flux and a back yoke of the core than those of a radial gap motor. In the radial gap motor, a core and a back yoke are easily formed by stacking of electrical steel sheets having the same shape in the thickness direction thereof. On the other hand, in the axial gap motor, the core has a shape projecting from the back yoke in the thickness direction thereof and the manufacture by stacking of electrical steel sheets having the same shape is impossible. Accordingly, in related art, the back yoke and the core are separately manufactured and joined to form the stator (for example, see JP-A-2009-296825).

In JP-A-2009-296825, a hole in which the core (teeth) is fitted is provided in the back yoke and the core is inserted into the hole. The joint of the core and the back yoke is realized by fixation of electrical steel sheets using a coating agent, fixing using an adhesive agent, welding, or the like.

However, in the axial gap motor, when the rotor is rotated by a rotating magnetic field, a reaction force of torque rotating the rotor acts as a force in the circumferential direction in the core at the stator side. The higher the output of the motor, the larger the force acts on the joint portion of the core and the back yoke. Accordingly, in the configuration of JP-A-2009-296825, the stator may be damaged.

SUMMARY

The present disclosure can be realized as the following embodiments or application examples. That is, an axial gap motor according to the present disclosure includes a rotating rotor, and a stator placed to face the rotor with a gap in a first direction parallel to a shaft of the rotation, wherein the stator has a core in which thin plates penetrated by magnetic flux are stacked along a second direction orthogonal to the first direction, and an annular yoke having the core, and a plurality of fitting portions of the core are fitted into a plurality of attachment portions of the yoke.

BRIEF DESCRIPTION OF THE DRAWINGS

FIG. 5 is a plan view schematically showing a shape of the core as seen toward the yoke.

FIG. 7 is an explanatory diagram exemplifying two types of forms of cores and shapes of stacked electrical steel sheets.

DESCRIPTION OF EXEMPLARY EMBODIMENTS

Figure 1:
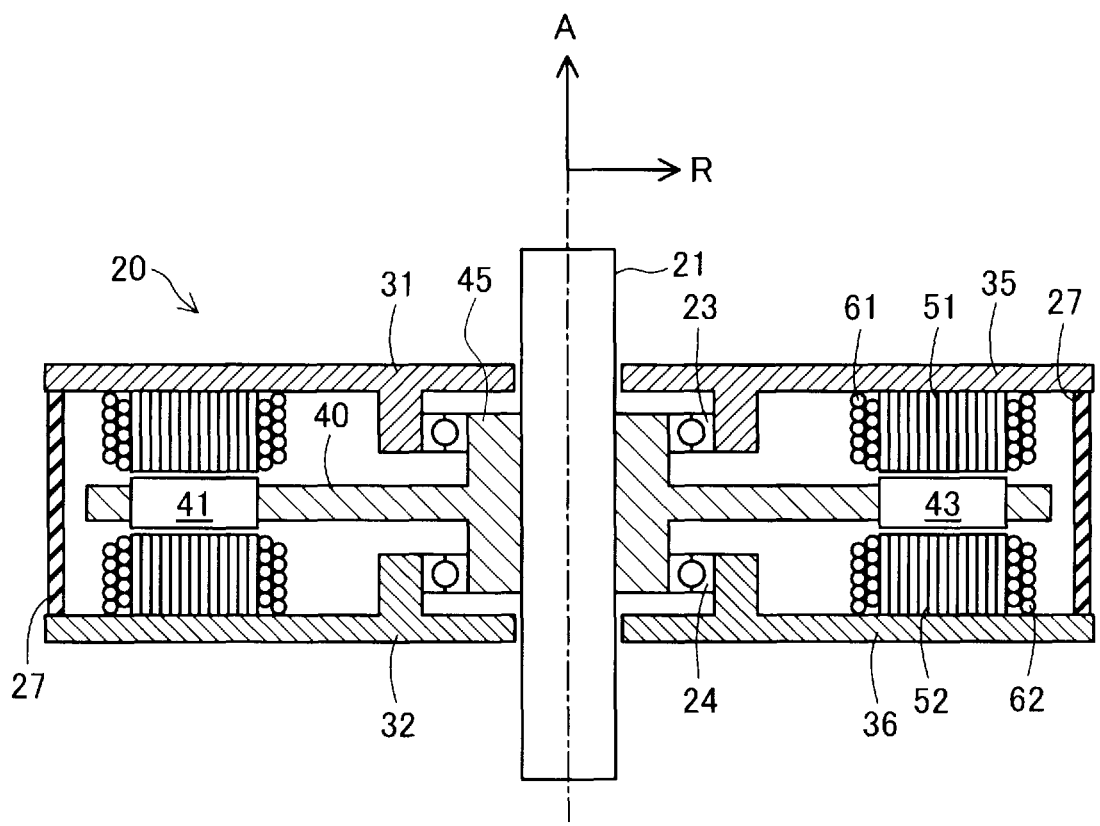
FIG. 1 is a schematic configuration diagram showing a schematic configuration of an axial gap motor of a first embodiment in a sectional view.

A. First Aspect:

(1) First Embodiment:

FIG. 1 is a schematic configuration diagram showing a schematic configuration of an axial gap motor 20 of the first embodiment in the sectional view. The axial gap motor 20 has the so-called double-stator structure including a rotor 40 at the center in an axial direction of a rotation shaft 21 and stators 31, 32 on both sides in an axial direction of the rotor 40. As shown in the drawing, the upward direction in the axial direction of the rotation shaft 21 is shown by sign A and the outward direction in the radial direction with respect to the rotation shaft 21 is shown by sign R. The directions shown by the signs A, R are the same in the other drawings. The direction of the sign A may be referred to as "axial direction" and the direction of the sign R may be referred to as "radial direction". In addition to these directions, the circumferential directions of the rotor 40 and the stators 31, 32 may be shown by sign C. When the direction of the sign A is a first direction, the directions of the radial direction R and the circumferential direction C correspond to a second direction orthogonal to the first direction.

The rotation shaft 21 is shown as a cylinder in FIG. 1, however, may be a hollow rotation shaft. In the axial gap motor 20, the thickness in the rotation axial direction A tends to be thinner and the dimension in the radial direction R tends to be larger. Accordingly, it is desirable to employ a configuration in which the diameter of the rotation shaft 21 is made larger as a hollow shaft and wires to the axial gap motor 20 pass through the shaft.

In the rotor 40 fixed substantially at the center in the axial direction of the rotation shaft 21, a plurality of, in the embodiment, twelve permanent magnets 41, 43 are placed uniformly in the circumferential direction near the end in the radial direction R. The number and arrangement of the permanent magnets 41, 43 are determined by the number of phases and the number of poles of the axial gap motor 20. In the center portion of the rotor 40, a fixing portion 45 to which the rotation shaft 21 is fixed is formed and the rotation shaft 21 is press-fitted into the fixing portion 45 and fixed. Obviously, the shaft and the portion may be coupled by a key and a key groove.

Figure 2:
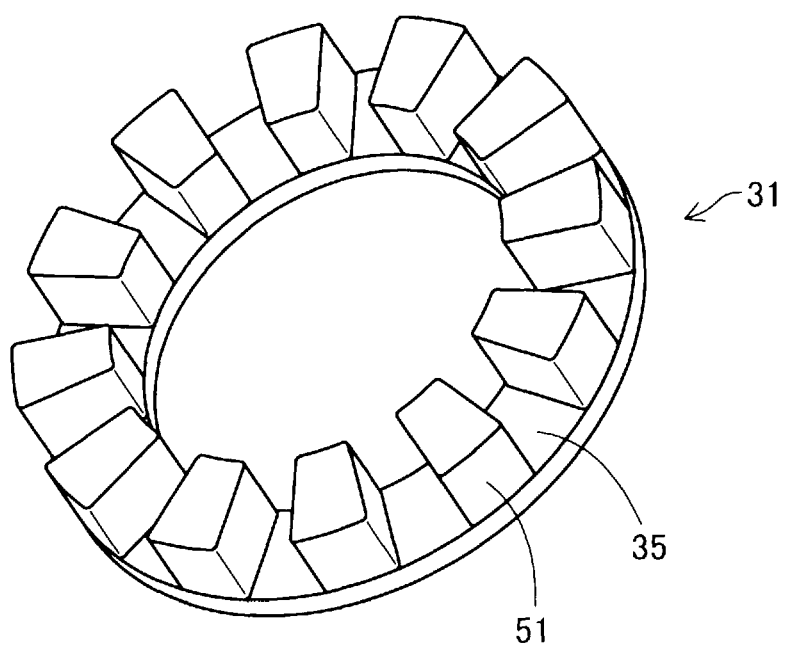
FIG. 2 is a perspective view exemplifying a shape of a stator.

The stators 31, 32 are attached to the fixing portion 45 of the rotor 40 via bearings 23, 24. By the bearings 23, 24, the rotation shaft 21 and the rotor 40 are rotatably held with respect to a motor case formed by coupling of the stators 31, 32 with side cases 27. In the stators 31, 32, stator cores (hereinafter, simply referred to as "cores") 51, 52 are provided to face the permanent magnets 41, 43 of the rotor 40. A schematic configuration of the stator 31 is shown in a perspective view in FIG. 2. The axial gap motor 20 of the embodiment has a 3-phase 4-slot configuration, and the number of cores 51 per stator 31 is twelve.

The stator 31 includes the twelve cores 51, a back yoke (hereinafter, simply referred to as "yoke") 35 provided in common to these cores 51, and coils 61 as winding coils wound around the outer circumferences of the respective cores 51. The yoke 35 is formed by stacking of annularly shaped, i.e., donut-shaped electrical steel sheets having substantially the same width as the width of the cores 51 in the radial direction and has a predetermined thickness. Insulating coatings are formed on the surfaces of the electrical steel sheets. After stacking, the insulating coatings are melted and the respective electrical steel sheets are fixed. Note that the stacked electrical steel sheets may be joined by application of an adhesive agent or welding. The joint between the electrical steel sheets is the same in the cores, which will be described later.

The coils 61 around the outer circumferences of the cores 51 may be individually wound around the cores 51, however, may be wound in bobbin shapes in advance and fitted around the outer circumferences of the cores 51. The other stator 32 similarly includes twelve cores 52, a yoke 36 in common to these cores 52, and coils 62 wound around the outer circumferences of the cores 52. The twelve coils 61 attached to the twelve cores 51 form a 3-phase 4-pole winding coil. The two stators 31, 32 have plane-symmetrical structures with the rotor 40 in between. The twelve permanent magnets 41, 43 provided in the rotor 40 and the cores 51, cores 52 face each other with gaps of predetermined distances along the axial direction A as the first direction.

Figure 3:
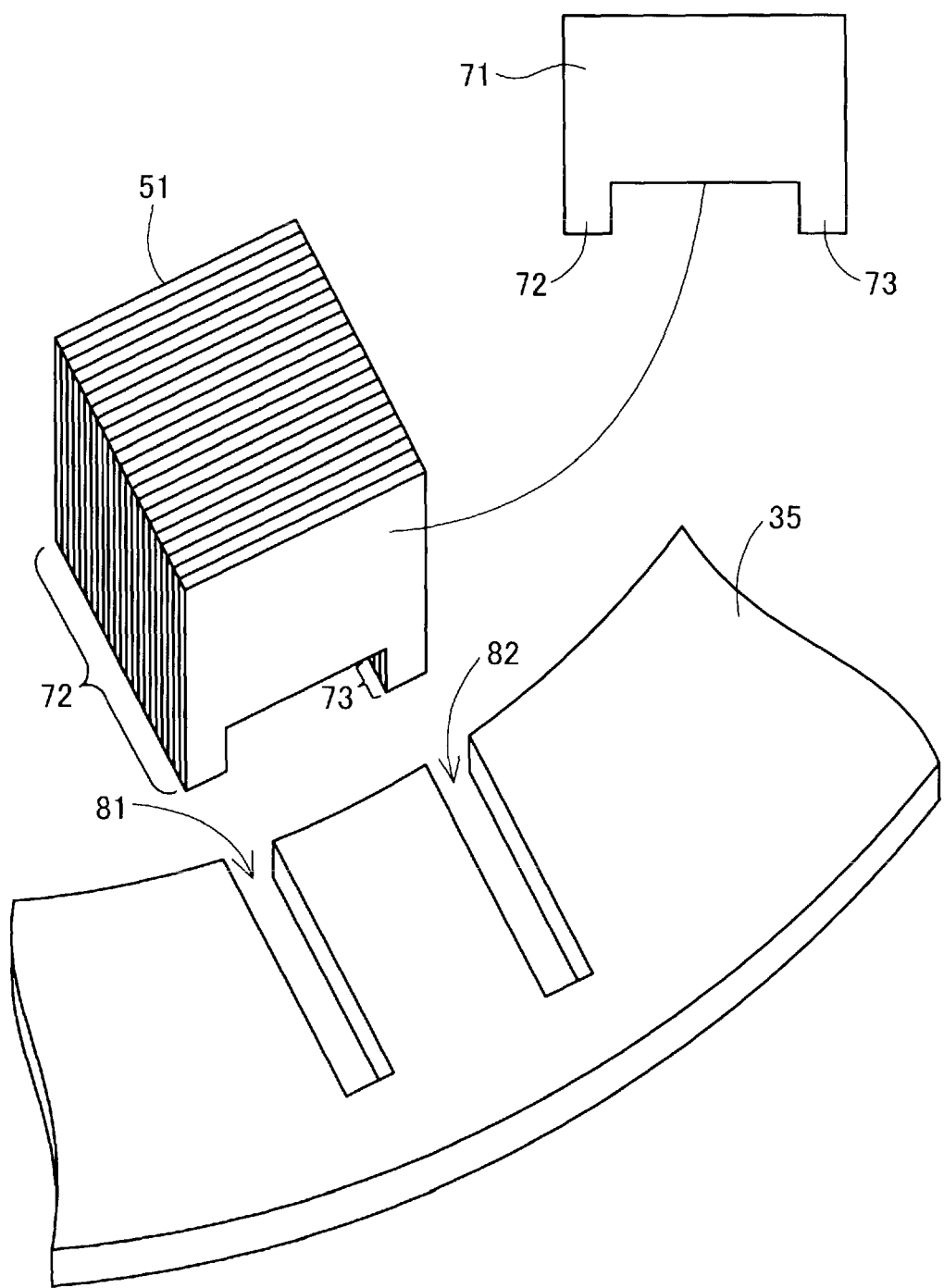
FIG. 3 is an explanatory diagram showing an attachment relationship between one core and a yoke forming the stator.

Next, the configuration of the core 51 in the first embodiment and the attachment of the core 51 to the yoke 35 is explained. FIG. 3 is an explanatory diagram showing an attachment relationship between one core 51 and the yoke 35 forming the stator 31. As shown in the drawing, the core 51 of the embodiment is formed by stacking of a plurality of thin plate-like electrical steel sheets 71. The respective electrical steel sheets 71 have the same shape and fitting portions 72, 73 having convex shapes on both sides at the lower end of the rectangular shape in the front view. Therefore, the core 51 in which the plurality of electrical steel sheets 71 are stacked has a rectangular parallelepiped shape as a whole and the fitting portions 72, 73 respectively continuously form two projecting portions in rectangular parallelepiped shapes on both sides of the lower end of the core 51. The electrical steel sheets 71 are not used singly, and "fitting portions" refer to convex-shape portions when the single electrical steel sheet 71 is described and refer to the entire portions in the rectangular parallelepiped shapes at the lower end of the core 51 when the stacked electrical steel sheets 71 are described.

Figure 4:
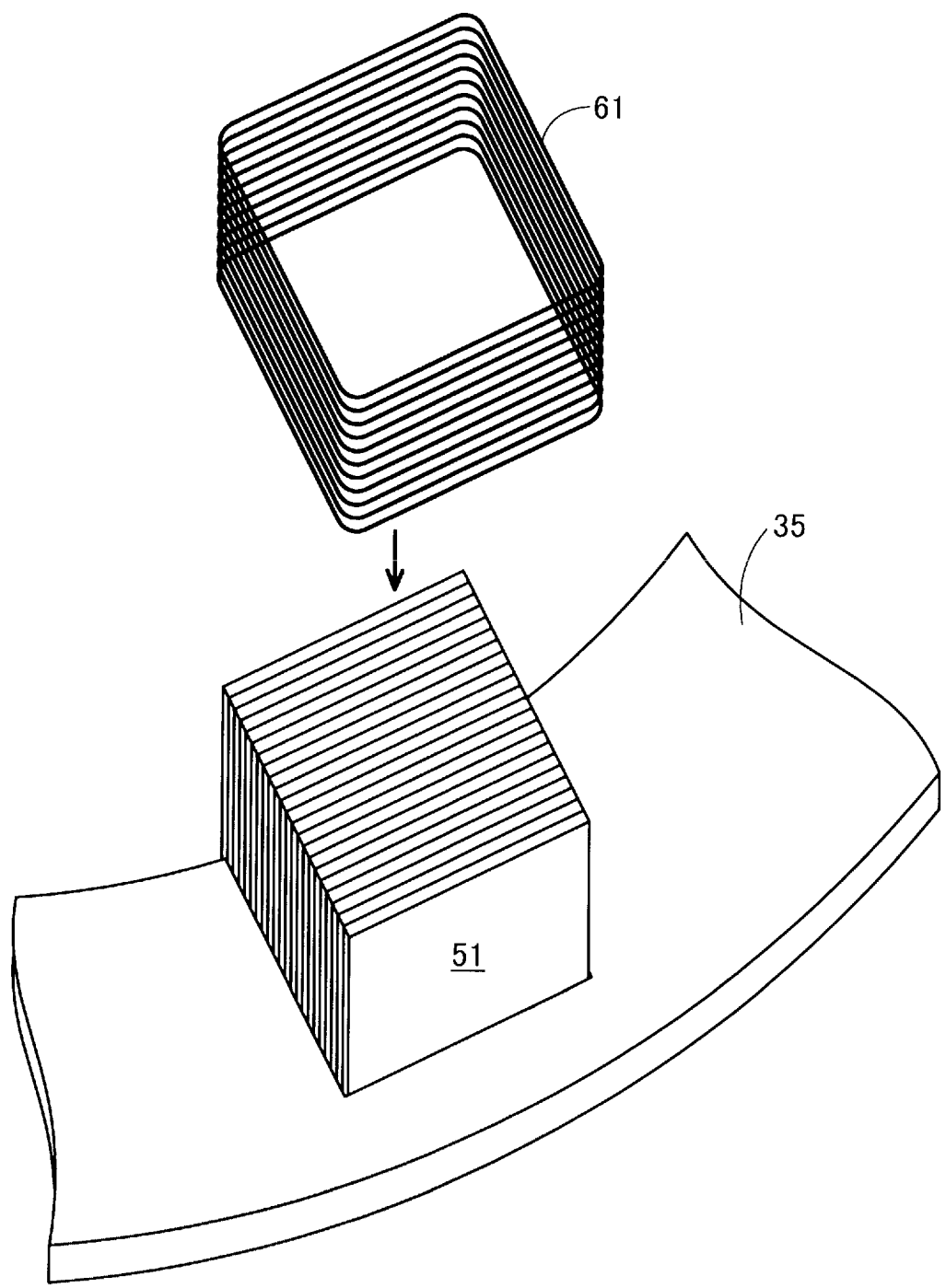
FIG. 4 is an explanatory diagram showing an attachment relationship of a coil to the core.

In the yoke 35 to which the core 51 is attached, attachment portions 81, 82 in groove shapes having predetermined lengths from the inner circumference side of the yoke 35 are provided in correspondence with the fitting portions 72, 73 of the core 51. The respective sizes of the attachment portions 81, 82 of the yoke 35 are equal to the sizes of the fitting portions 72, 73 of the core 51, and thereby, the core 51 may be fixed to the yoke 35 by fitting of the fitting portions 72, 73 of the core 51 into the attachment portions 81, 82 of the yoke 35. That is, the fitting portions 72, 73 of the core 51 are fitted in the attachment portions 81, 82 of the yoke 35. The position where the core 51 is fixed to the yoke 35 by attachment of the fitting portions 72, 73 to the attachment portions 81, 82 is the fixed position of the core. FIG. 4 shows the state in which the core 51 is fixed in the fixed position. The core 51 and the yoke 35 may be fixed by press fitting of the fitting portions 72, 73 into the attachment portions 81, 82 or fixed by an adhesive agent or welding. The coil 61 is fit in the core 51 in the state shown in FIG. 4, and thereby, the stator 31 is assembled.

FIG. 5 is a plan view schematically showing the shape of the core 51 as seen toward the yoke 35. Note that, in the plan view of the core 51 from the opposite side to the yoke 35, the attachment portions 81, 82 of the yoke 35 are not actually seen, however, the outer shape lines of the attachment portions 81, 82 are shown by hidden lines (broken lines) in the drawing to facilitate understanding of the attachment relationship. This is the same in the other drawings unless otherwise described. In FIG. 5, the rotation axial direction A, the radial direction R, and the circumferential direction C are shown. For convenience of illustration, the center A in the rotation axial direction is not drawn in the center position of the figure of the yoke 35, but close to the range in which the yoke 35 is drawn. In the first embodiment and modified examples thereof, the plurality of attachment portions (here, two attachment portions 81, 82) are provided in positions of the yoke 35 apart in the circumferential direction C. In other words, the two attachment portions 81, 82 are located side by side in the circumferential direction C of the yoke 35. A configuration in which the plurality of attachment portions are apart along the radial direction R of the yoke 35 will be explained in the second embodiment. The direction of stacking of the electrical steel sheets 71 is the radial direction R. A configuration in which the stacking direction of the electrical steel sheets 71 is the circumferential direction C will be explained in the section of another embodiment.

Figure 6A:
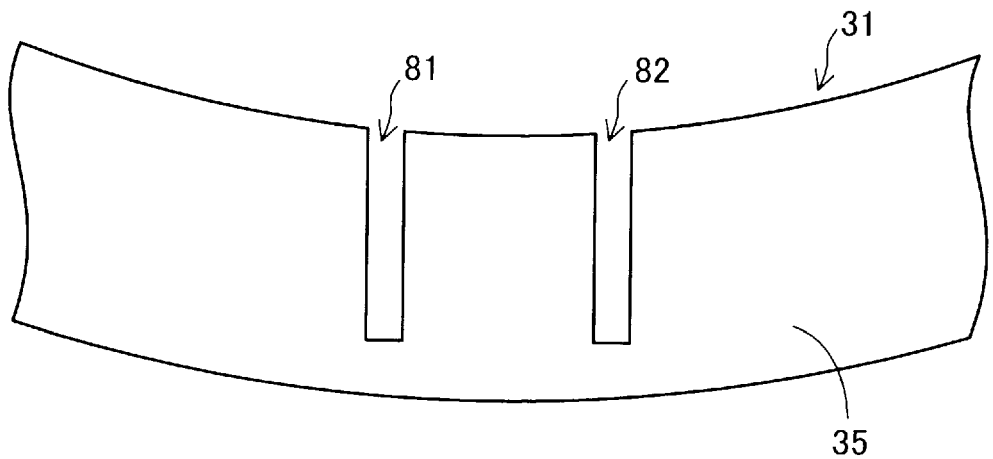
FIG. 6A is an explanatory diagram exemplifying a case where attachment portions in groove shapes having predetermined lengths from an inner circumference side toward an outer circumference side of the yoke are provided.
Figure 6B:
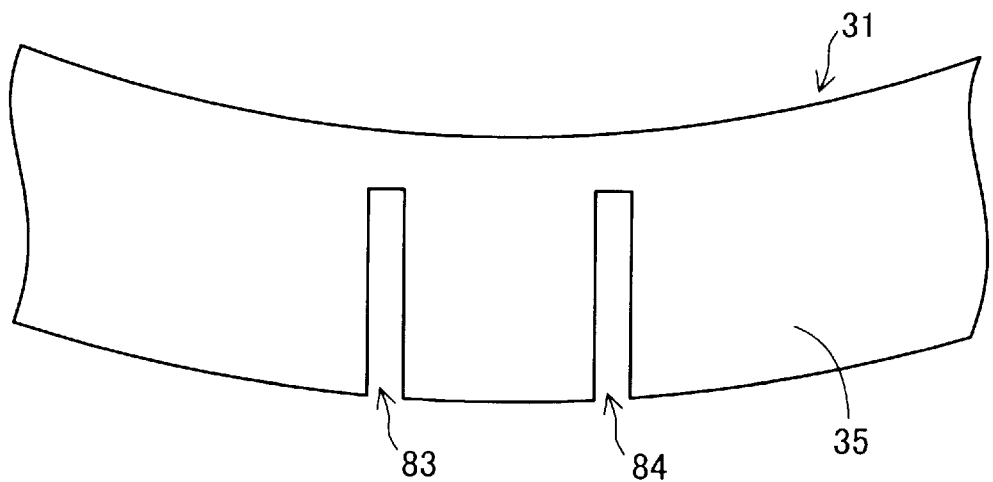
FIG. 6B is an explanatory diagram exemplifying a case where attachment portions in groove shapes having predetermined lengths from the outer circumference side toward the inner circumference side of the yoke are provided.
Figure 6C:
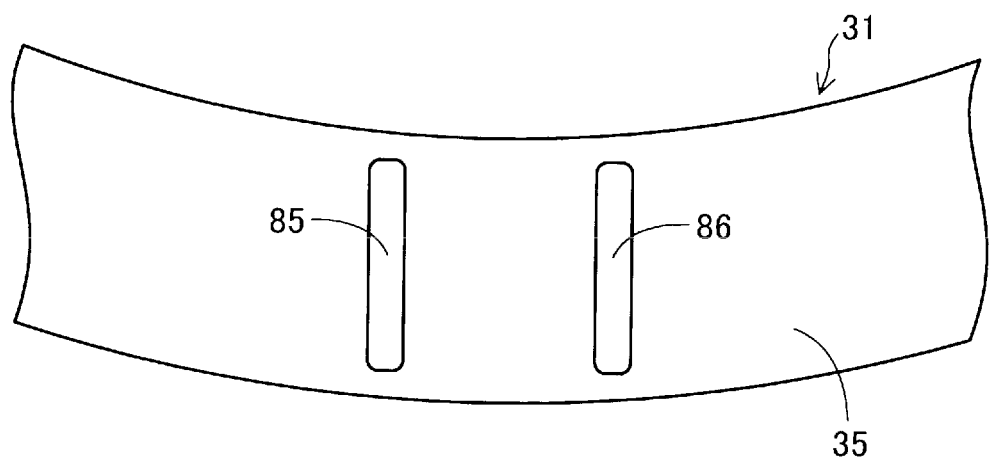
FIG. 6C is an explanatory diagram exemplifying a case where attachment portions are provided as opening portions elongated in a width direction of the yoke substantially at a center in the width direction.

The positions of the attachment portions 81, 82 can be widely varied. For example, as shown in FIG. 6A, the attachment portions 81, 82 in groove shapes having predetermined lengths from the inner circumference side toward the outer circumference side of the yoke 35 may be employed or, as shown in FIG. 68, attachment portions 83, 84 in groove shapes having predetermined lengths from the outer circumference side toward the inner circumference side of the yoke 35 may be employed. Or, as shown in FIG. 6C, attachment portions 85, 86 may be provided as opening portions elongated in the width direction of the yoke 35 substantially at the center in the width direction.

According to the above described first embodiment, in the axial gap motor 20, the two fitting portions 72, 73 of the core 51 are fixed by the two attachment portions 81, 82 of the yoke 35, and thereby, even when the reaction force of torque due to magnetic flux for rotation of the rotor 40 is applied to the core 51 in the circumferential direction, the possibility that the core 51 comes off the yoke 35 or is damaged by a shear force may be reduced. Further, in the embodiment, the fitting portions 72, 73 of all electrical steel sheets 71 receive the force in the circumferential direction, and the strength against the shear force may be further increased. In addition, in the embodiment, the electrical steel sheets 71 in the same shape forming the core 51 may be used, and the manufacture of the cores 51 may be easier. In the embodiment, the core 51 may be attached to the yoke 35 only by insertion of the plurality of fitting portions 72, 73 into the attachment portions 81, 82 and the manufacture of the axial gap motor 20 may be easier in this regard.

Further, in the embodiment, the fitting portions 72, 73 and the attachment portions 81, 82 are provided in the width direction (radial direction R) of the yoke 35, and thereby, the area receiving the force applied in the circumferential direction C of the yoke 35 is wider, in other words, the load per unit area is smaller and the strength against the shear force in the circumferential direction may be further increased.

In the embodiment, the electrical steel sheets 71 are used for the core 51, and thereby, high efficiency as the core forming the axial gap motor 20 may be realized. In the axial gap motor 20, formation of a core using the so-called powder compacting formed by solidification of magnetic material powder with high pressure is known. On the other hand, the core 51 formed by stacking of the electrical steel sheets 71 exhibited higher performance of about 10% in loss and about 5% in output torque. Note that, in the embodiment, the yoke 35 is also formed by stacking of electrical steel sheets having the same shape, and the manufacture is easier and the higher efficiency including the yoke is realized.

(2) Another Embodiment 1 of First Aspect:

In the axial gap motor 20 of the first embodiment, the respective fitting portions and attachment portions are provided in the width direction of the yoke 35 and the two fitting portions or two attachment portions are provided in the positions apart in the circumferential direction C of the yoke 35. The other embodiment having the configuration will be explained as below. FIG. 7 is an explanatory diagram showing forms of a core 51A and a core 51a and shapes of stacked electrical steel sheets. In FIG. 7, the respective electrical steel sheets are drawn in the front view as seen in the stacking direction and the cores 51A, 51a are drawn in the bottom view as seen from the side of the yoke 35. Both of the cores 51A, 51a are formed by stacking of two types of electrical steel sheets 711, 712.

In the core 51A, on both sides of a plurality of stacked electrical steel sheets 711, one or more electrical steel sheets 712 are respectively stacked. The electrical steel sheets 711 have the same shape as the electrical steel sheets 71 of the first embodiment shown in FIG. 2. Therefore, in the portions in which the electrical steel sheets 711 are stacked, fitting portions 72A, 73A form projected shapes at the lower end of the core 51A substantially in a rectangular parallelepiped shape. On the other hand, the electrical steel sheets 712 have substantially rectangular shapes without portions corresponding to the fitting portions 72A, 73A compared to the electrical steel sheets 711. Therefore, in the portions in which the electrical steel sheets 712 are stacked, there are no projections corresponding to the fitting portions 72A, 73A. Even when the core 51A is formed in the above described shape, the core 51A may be respectively attached to the attachment portions 81, 82 in the shapes shown in FIG. 6A, the attachment portions 83, 84 in the shapes shown in FIG. 6B, and the attachment portions 85, 86 in the shapes shown in FIG. 6C.

(3) Another Embodiment 2:

In the core 51a as the other embodiment shown in FIG. 7, only on one side of a plurality of stacked electrical steel sheets 711, a plurality of electrical steel sheets 712 are stacked. In this case, the fitting portions 72A, 73A are formed closer to the one side of the core 51a in the radial direction. This core 51a may be attached to the attachment portions 81, 82 or the like in the various forms shown in FIG. 6A to FIG. 6C. Note that the cores 51A, 51a may be attached to the attachment portions 81, 82 or the like from a direction opposite to the surface of the yoke 35, i.e., from above in the plan view of the yoke 35 or attached to the attachment portions 81 to 84 in the forms in FIGS. 6A and 6B to slide in the surface direction of the yoke 35 from the outside at the inner circumference side or the outside at the outer circumference side.

Figure 8:
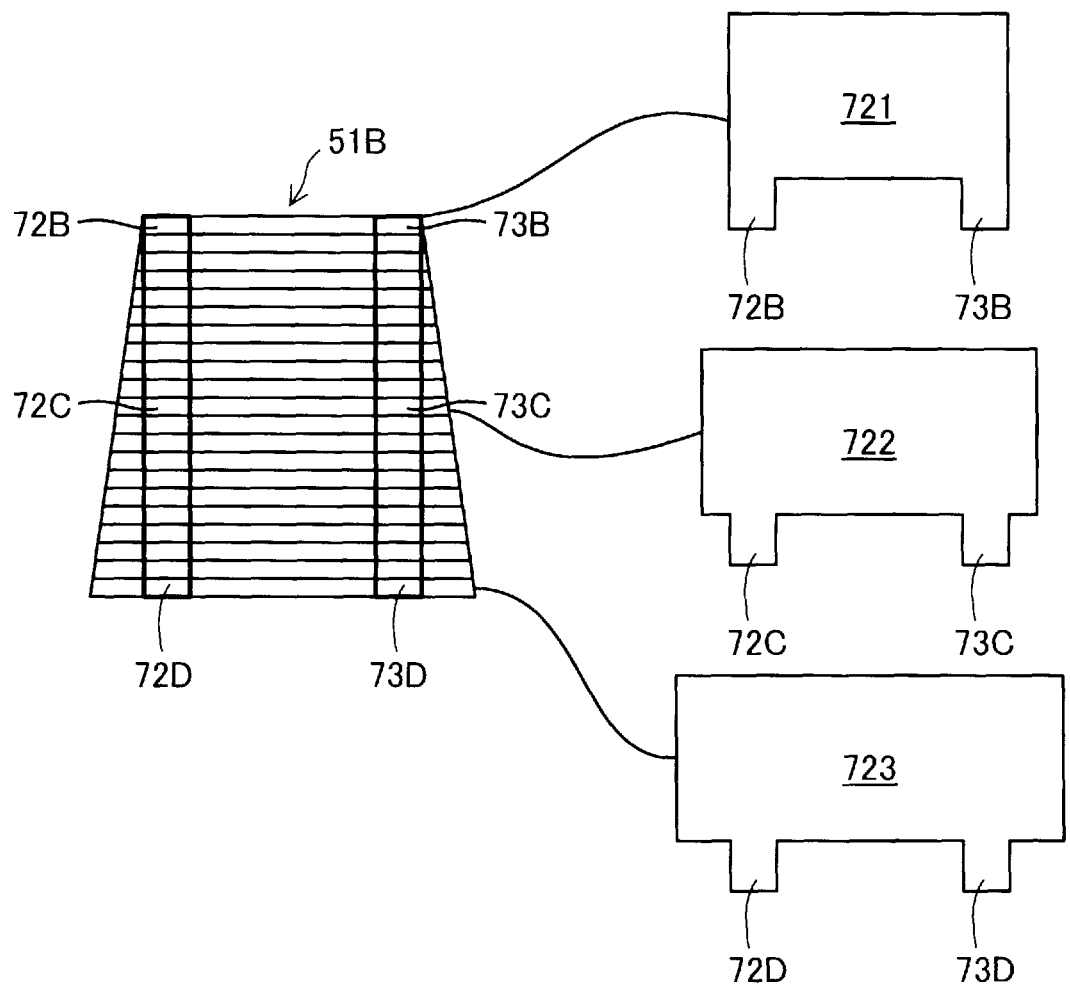
FIG. 8 is an explanatory diagram showing a form of another core.

(4) Another Embodiment 3:

FIG. 8 is an explanatory diagram showing the form of yet another core 51B. The core 51B is different in that the plan view shape is a trapezoidal shape from the above described cores 51, 51A, 51a in the rectangular plan view shapes. To form the core 518 in the shape, it is necessary to make the shapes of all electrical steel sheets to be stacked different from one another. That is, the heights of the respective electrical steel sheets are the same and the widths (circumferential lengths) of the electrical steel sheets located closer to the outer circumference side are larger.

In FIG. 8, as representative electrical steel sheets forming the core 51B, three of the electrical steel sheet 721 used for the inner circumference end of the yoke, the electrical steel sheet 722 used for forming the core 51B in the middle in the stacking direction, and the electrical steel sheet 723 used for the outer circumference end of the yoke are exemplified. As shown in the drawing, the respective electrical steel sheets 721, 722, 723 have respectively different outer shapes, but shapes of fitting portions 72B, 73B or the like attached to the attachment portions at the yoke side are the shapes attached to the attachment portions 81, 82 shown in FIG. 6A, i.e., the shapes attached to the two attachment portions 81, 82 provided in parallel. As a result, in the electrical steel sheet 721, the fitting portions 72B, 73B are provided on both ends of the electrical steel sheet 721. In the electrical steel sheet 722, fitting portions 72C, 73C are provided to be located inside from both ends of the electrical steel sheet 722. In the electrical steel sheet 723, fitting portions 72D, 73D are provided to be located more inside from both ends of the electrical steel sheet 723. Note that the distances between all fitting portions are equal.

Regarding the above described core 51B, when the cores 51B are attached to the yoke 35, the distances between the adjacent cores 51B at the inner circumference end of the yoke 35 and the distances between the adjacent cores 51B at the outer circumference end of the yoke 35 may be made closer to equality than those of the cores in the rectangular plan view shapes. Accordingly, the areas of the cores 51B attached to the yoke in the plan view may be made larger, the magnetic force that may be generated at energization of the coils may be increased, and the output as the axial gap motor 20 may be increased. Note that, when the core has the trapezoidal shape, the coil attached to the core preferably has a trapezoidal inner shape according to the core.

Figure 9:
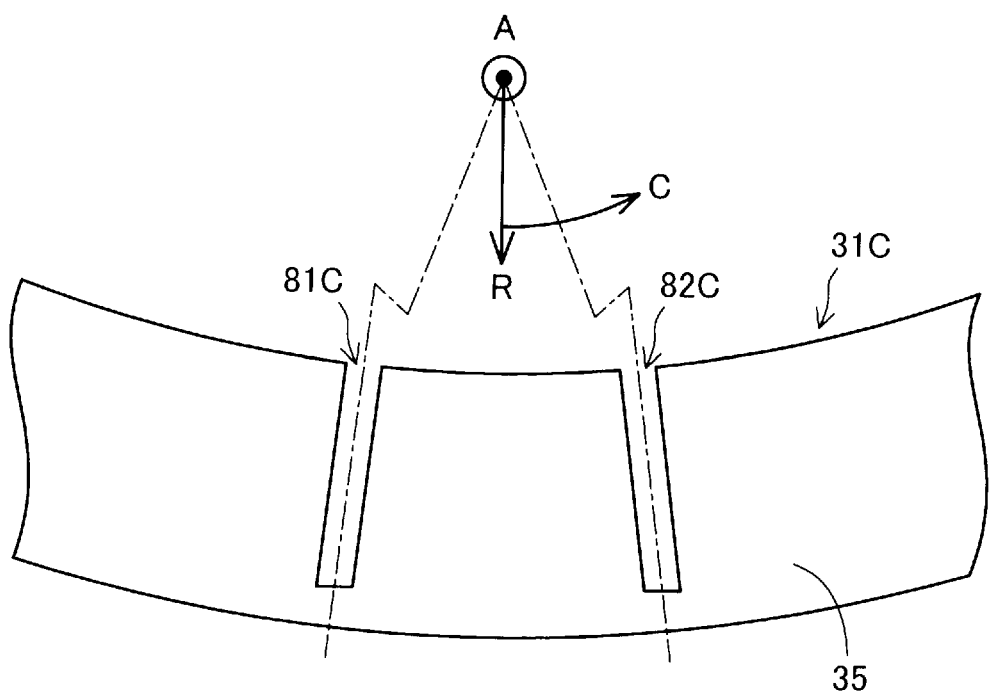
FIG. 9 is an explanatory diagram showing shapes of the yoke and the attachment portions used for another stator.
Figure 10:
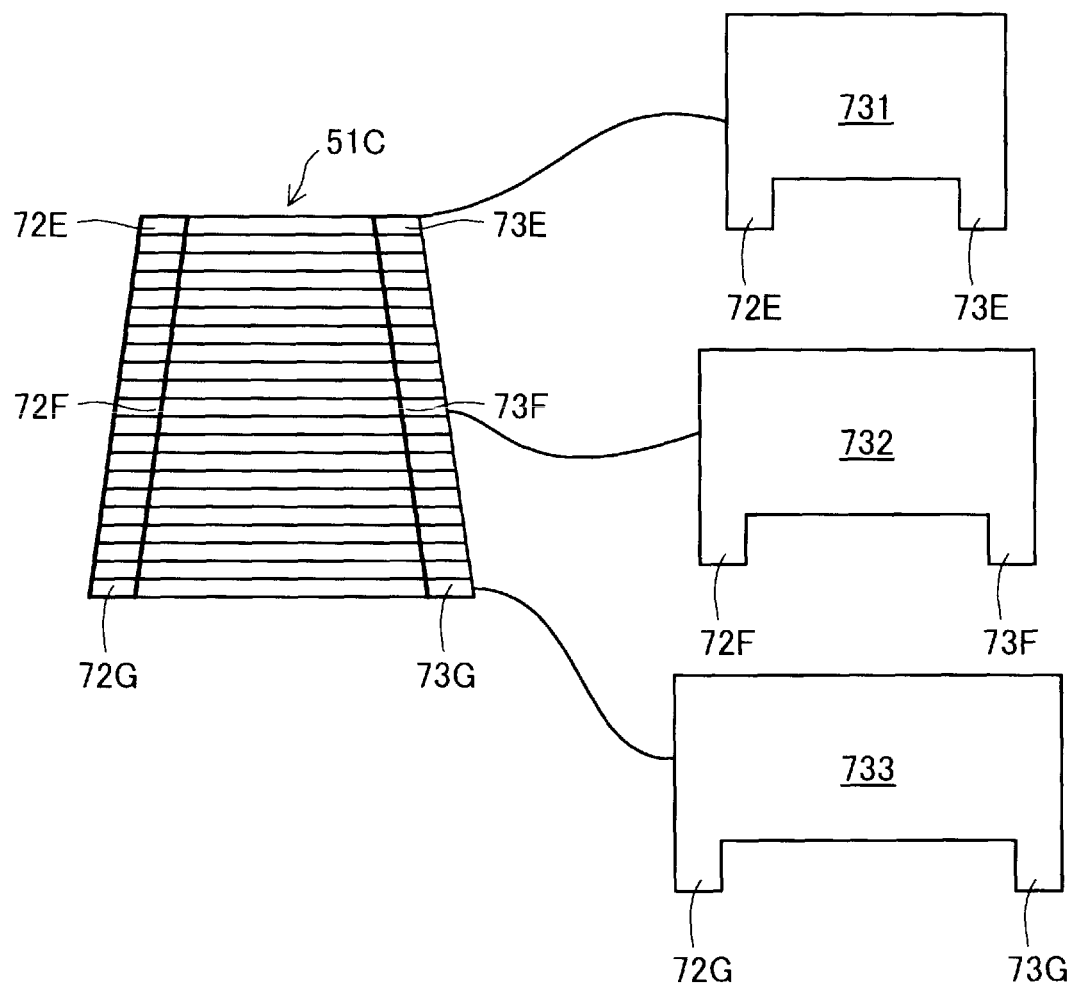
FIG. 10 is an explanatory diagram exemplifying shapes of a core attached to the yoke shown in FIG. 9 and electrical steel sheets forming the core.

(5) Another Embodiment 4:

As yet another embodiment, a configuration of a stator 31C including the yoke 35 and a core 51C is exemplified in FIGS. 9 and 10. The core 51C used for the stator 31C of the embodiment has an approximated whole shape to that of the core 51B shown in FIG. 8. That is, the core 51C has a substantially trapezoidal shape having a width in the circumferential direction C larger toward the outer circumference side of the yoke 35 when attached to the yoke 35. The core 51C is different from the core 51B shown in FIG. 8 in that the fitting portions on both sides of the core 51C are not parallel to each other like attachment portions 81C, 82C provided in the yoke 35 and have shapes along the radial direction R from the center of the yoke 35.

Therefore, as shown in FIG. 10, all of the respective electrical steel sheets forming the core 51C have different sizes and substantially similar shapes. In FIG. 10, as representative electrical steel sheets forming the core 51C, three of the electrical steel sheet 731 used for the inner circumference end of the yoke, the electrical steel sheet 732 used for forming the core 51C in the middle in the stacking direction, and the electrical steel sheet 733 used for the outer circumference end of the yoke are exemplified. As shown in the drawing, in the respective electrical steel sheets 731, 732, 733, shapes of fitting portions 72E, 73E or the like attached to the attachment portions 81C, 82C at the yoke side are the shapes attached to the attachment portions 81C, 82C shown in FIG. 9, i.e., the shapes attached to the attachment portions 81C, 82C at the distances gradually longer toward the outside in the radial direction. As a result, the distance between the fitting portions provided on both sides of each electrical steel sheet is smallest between the fitting portions 72E, 73E of the electrical steel sheet 731, the second smallest between fitting portions 72F, 73F of the electrical steel sheet 732, and the longest between fitting portions 72G, 73G in the electrical steel sheet 733.

The core 51C having the above described configuration has the trapezoidal plan view shape like the core 51B, and the wider area may be secured as the core on the yoke 35. Further, the distance between the two attachment portions 81C, 82C is longer toward the outer circumference direction of the yoke 35. When the fitting portions of the core 51C are fitted into the attachment portions 81C, 82C from above the yoke 35, the core 51C does not slidingly come off by a force in any direction along the surface of the yoke 35. Further, the functions and effects are the same as those of the cores 51, 51A, 51a, 51B of the above described other embodiments may be obviously exerted.

Figure 11:
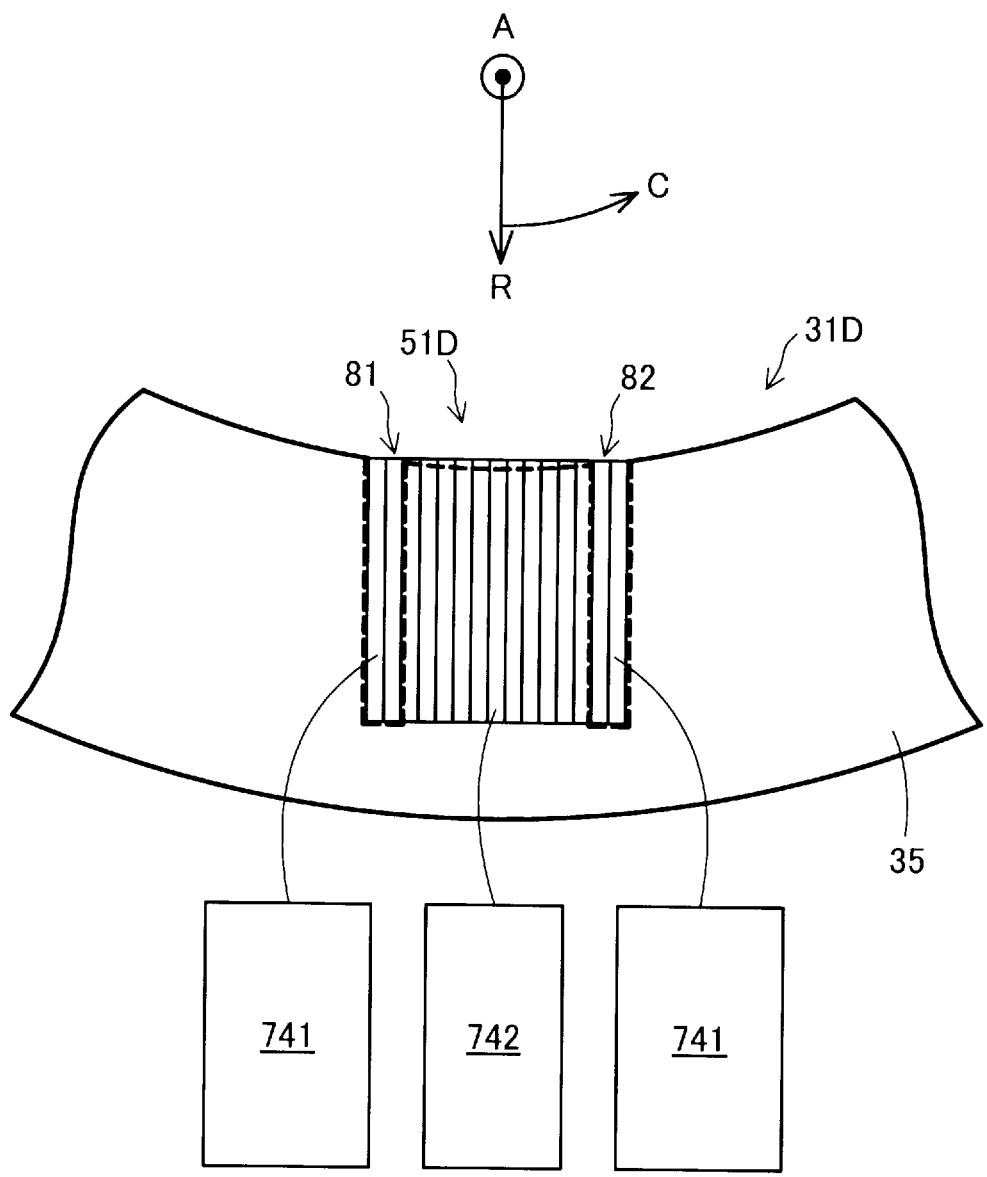
FIG. 11 is a plan view showing a part of a stator as another embodiment.

(6) Another Embodiment 5:

FIG. 11 is the plan view showing the part of a stator 31D as yet another embodiment. In the embodiment, the attachment portions 81, 82 at the yoke 35 side have the same shapes as those of the first embodiment (see FIG. 6A). On the other hand, a core 51D has the same outer shape as that of the first embodiment, however, is different in the stacking direction of the electrical steel sheets. That is, in the core 51D, the electrical steel sheets are arranged along the circumferential direction C of the yoke 35. Accordingly, this core 51D is formed by electrical steel sheets 741, 742 having two sizes. Pluralities of electrical steel sheets 741 are respectively stacked on both sides of the core 51D and the electrical steel sheets 742 smaller than the electrical steel sheets 741 are stacked in the center region between the electrical steel sheets 741. These electrical steel sheets 741, 742 are stacked with the upper sides at the same level. Therefore, the core 51D including the stacked and welded electrical steel sheets is different in the stacking direction of the electrical steel sheets, but has the same outer shape as the core 51 of the first embodiment. In this case, the downsides of the electrical steel sheets 741 elongated in the height direction project and form fitting portions, and the fitting portions are attached to the attachment portions 81, 82.

In the core 51D having the above described form, when a force in the circumferential direction C is applied as the axial gap motor 20, the plurality of electrical steel sheets 741 receive the force, and the sufficient strength against the shear force may be secured. Further, the core has an advantage that processing of the electrical steel sheets is easy because it is only necessary to stack the rectangular electrical steel sheets. Furthermore, even when the number of cores is increased or decreased or the sizes of the cores in the circumferential direction are changed in design, the change may be addressed only by change of the number of stacked electrical steel sheets 742.

Figure 12:
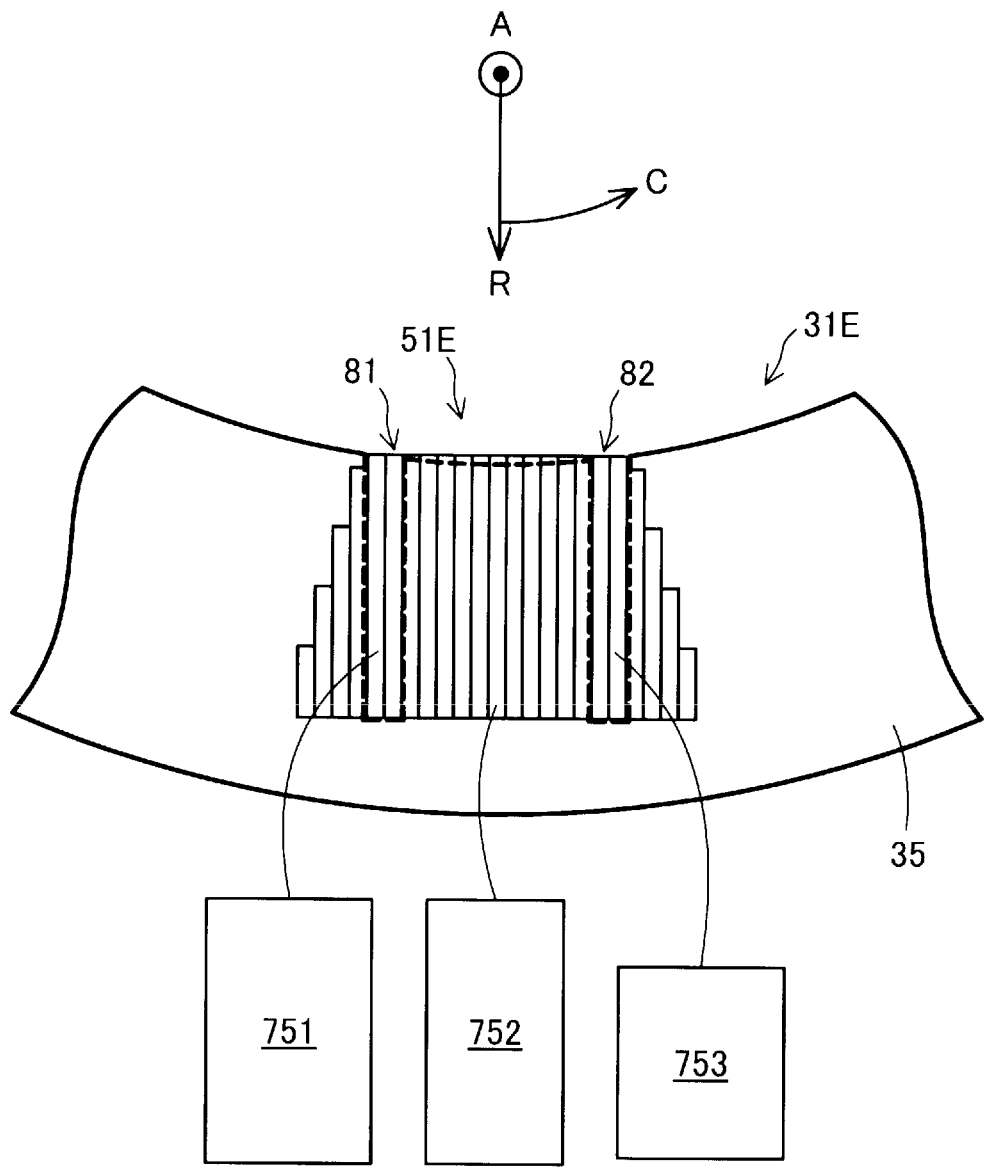
FIG. 12 is a plan view showing a part of a stator as yet another embodiment.

(7) Another Embodiment 6:

Next, a stator 31E as another embodiment 6 will be explained using FIG. 12. In this stator 31E, the stacking direction of electrical steel sheets forming a core 51E and the configurations of the attachment portions 81, 82 are the same as those of the stator 31D of the other embodiment 5. In the stator 31E, the core 51E has a trapezoidal plan view shape different from the core 51D. In the core 51E, to form the trapezoidal plan view shape, the sizes of the electrical steel sheets at the outer side in the stacking direction of the core 51E are gradually smaller. That is, in the core 51E of the embodiment, like the core 51D shown in FIG. 11, on the outside of stacked two types larger and smaller electrical steel sheets 751 and 752, pluralities of electrical steel sheets 753 having dimensions gradually decreasing in the width direction (radial direction R) of the yoke 35 are stacked.

As a result, the core 51E of the embodiment has the trapezoidal plan view shape and may secure a wide area as the core on the yoke 35. Also, in this embodiment, the size change of the core 51E in the circumferential direction may be easily addressed.

As above, various embodiments of the first aspect are explained, however, the embodiments of the first aspect are not limited to those. In the above described respective embodiments, the number of attachment portions is two, but may be three or more. In a case of three, for example, a new attachment portion may be provided between the attachment portions 81, 82 and a fitting portion may be additionally provided in a corresponding portion of the core. Further, the fitting portion may be formed by post-processing of a rectangular parallelepiped core formed by stacking of rectangular electrical steel sheets having the same shape. At the post-processing, the stacked electrical steel sheets may be processed by being fixed by a jig or the like. In this case, the degree of freedom of the shapes and arrangement of the fitting portions is higher.

Figure 13:
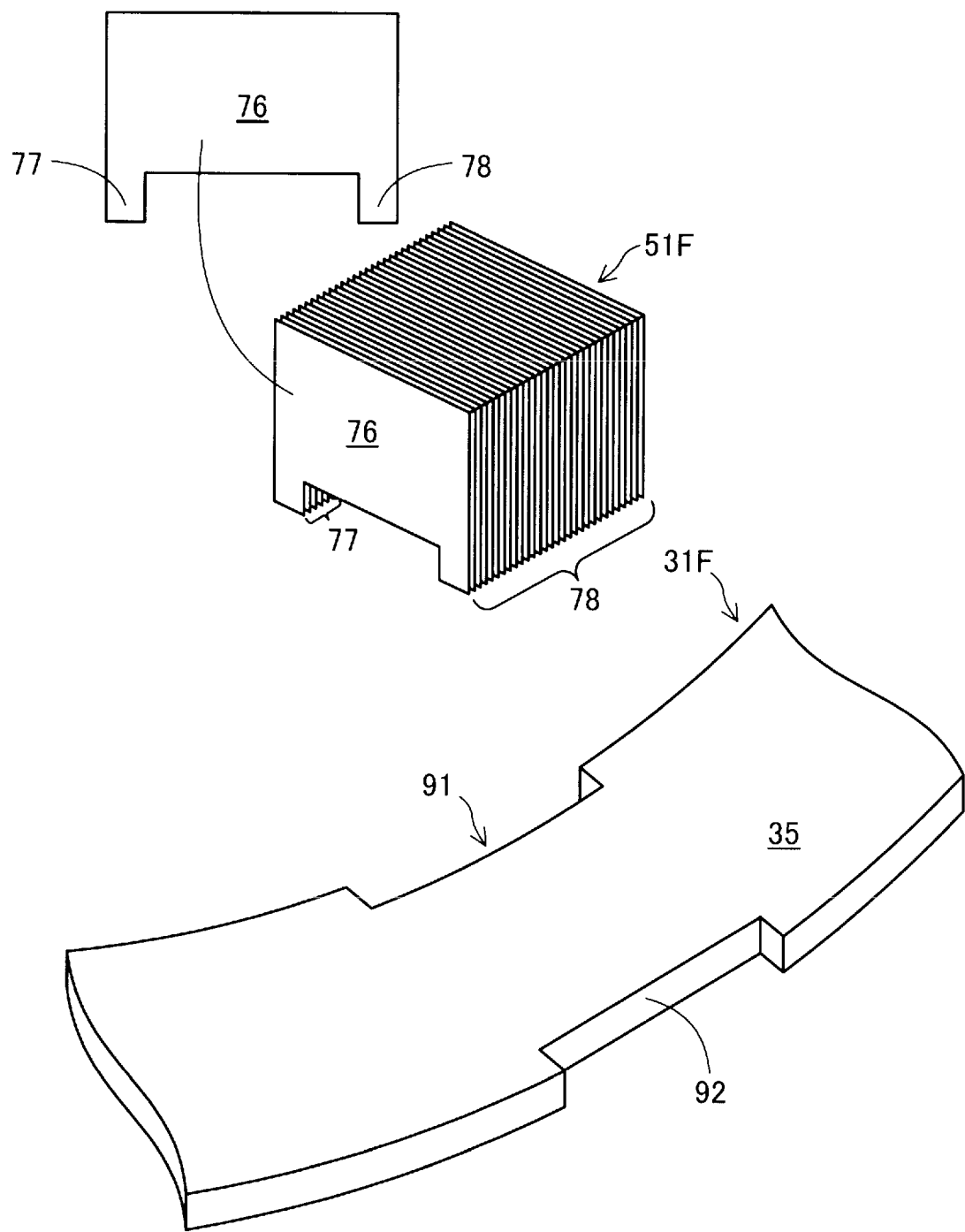
FIG. 13 is a perspective view showing a part of a stator of a second embodiment.

B. Second Aspect:

(8) Second Embodiment:

Next, a configuration of the axial gap motor 20 of the second embodiment will be explained using FIGS. 13 to 22. The second embodiment and the other embodiments are collectively referred to as "second aspect". In the above described first aspect, all of the attachment portions 81, 82 or the like are provided in the width direction of the yoke 35 and the plurality of attachment portions are provided apart in the circumferential direction of the yoke 35. On the other hand, in the second aspect, as shown in FIG. 13, two attachment portions 91, 92 are provided in the end portion at the inner circumference side as the innermost position of the yoke 35 and the end portion at the outer circumference side as the outermost position. The lengths of the attachment portions 91, 92 in the circumferential direction are the same in the second embodiment.

A stator 31F of the second embodiment includes the yoke 35 having the attachment portions 91, 92 in locations corresponding to a plurality of cores 51F, the plurality of cores 51F attached to the yoke 35, and coils (not shown) attached to the respective cores 51F. The attachment of the coils is the same as that described in the first embodiment (see FIGS. 4 and 5).

Figure 14:
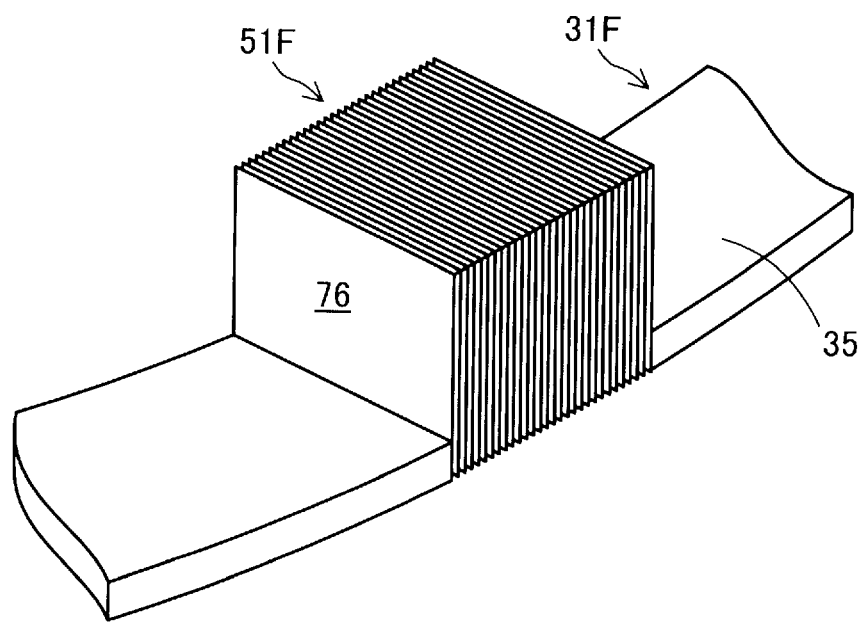
FIG. 14 is a perspective view showing a state in which a core of the second embodiment is attached to a yoke.
Figure 15:
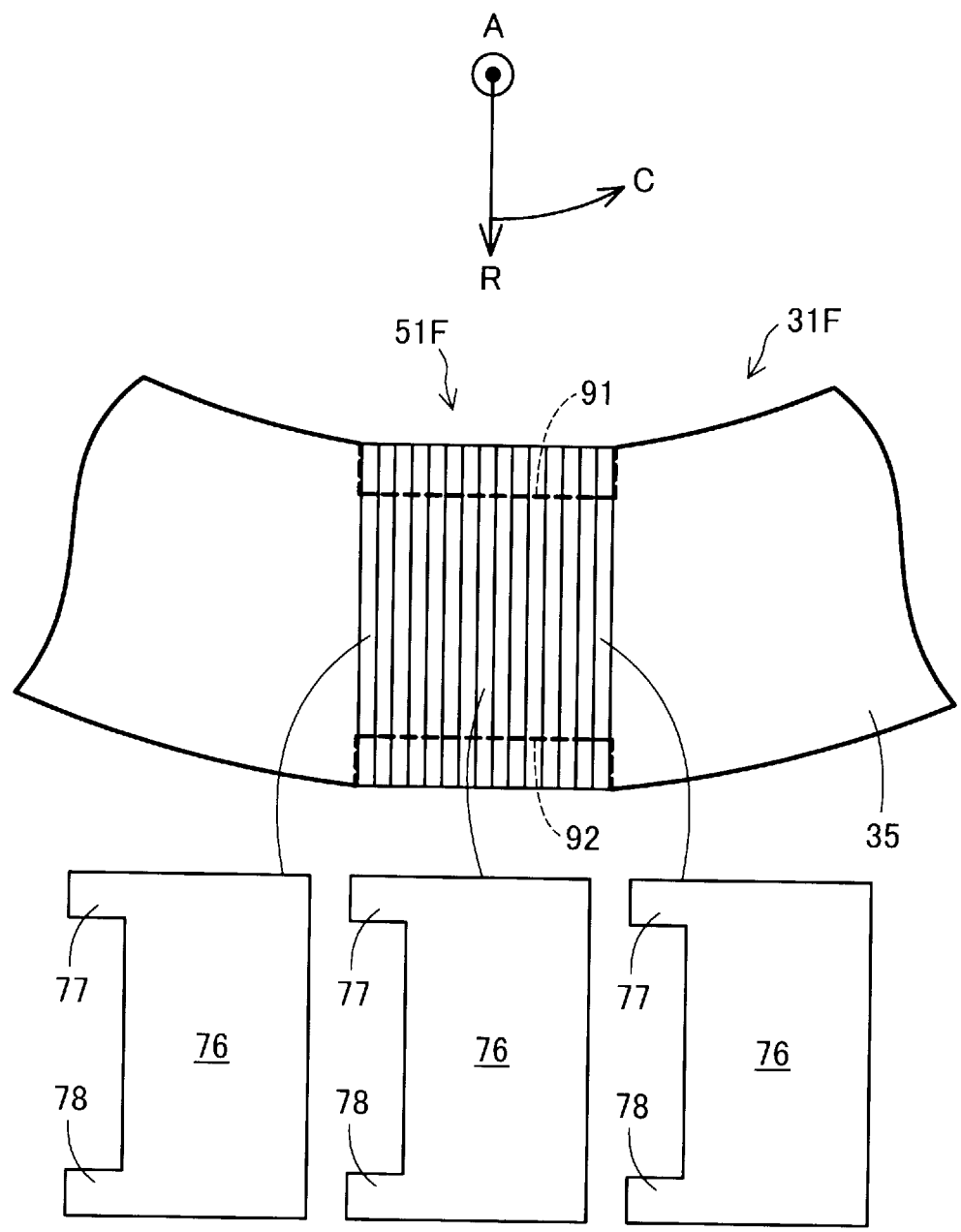
FIG. 15 is an explanatory diagram showing a part of the stator of the second embodiment in a plan view.

The core 51F of the embodiment has a similar shape to the core 51 of the first embodiment, i.e., a form in which electrical steel sheets 76 having fitting portions 77, 78 projecting downward at both sides of the lower end are stacked. The distance between the fitting portions 77, 78 is equal to the distance between the attachment portions 91, 92. The fitting portion 77 is provided in correspondence with the inside position of the yoke 35 in the radial direction and the fitting portion 78 is provided in correspondence with the outside position of the yoke 35. That is, the fitting portions 77, 78 are arranged in the radial direction R of the yoke 35. The widths of the fitting portions 77, 78 are equal to the widths of the attachment portions 91, 92 in the circumferential direction at the yoke 35 side. Therefore, the fitting portions 77, 78 of the core 51F are fitted and attached into the attachment portions 91, 92 of the yoke 35, and thereby, as shown in FIG. 14, the core 51F is placed in the width direction of the yoke 35. FIG. 15 shows the core 51F with the yoke 35 attached thereto in the plan view. In this case, as shown in FIG. 15, all the stacked electrical steel sheets 76 may be formed in the same shape.

According to the above described second embodiment, in the axial gap motor 20, the two fitting portions 77, 78 of the core 51F are fixed by the two attachment portions 91, 92 of the yoke 35, and thereby, even when the reaction force of torque due to magnetic flux for rotation of the rotor 40 is applied to the core 51F in the circumferential direction C, the possibility that the core 51F comes off the yoke 35 or is damaged by the shear force may be reduced. Further, as shown in FIG. 14, the core 51F of the embodiment is easily formed in the shape covering the entire range of the yoke 35 in the width direction and, as a result, the core having large area relative to the yoke 35 may be obtained. Generally, with larger cores, output as a motor may be made larger than that with smaller cores. Note that the shapes of the electrical steel sheets 76 are formed in the shapes with portions projecting outward of the fitting portions 77, 78 like the electrical steel sheets 723 shown in FIG. 8, and thereby, the shape of the core can be made even larger with respect to the width direction of the yoke 35.

Furthermore, in the embodiment, the electrical steel sheets 76 in the same shape forming the core 51F may be used and the manufacture of the cores 51F may be easier. In the embodiment, the core 51F may be attached to the yoke 35 only by insertion of the plurality of fitting portions 77, 78 into the attachment portions 91, 92 and the manufacture of the axial gap motor 20 may be easier in this regard.

Figure 16:
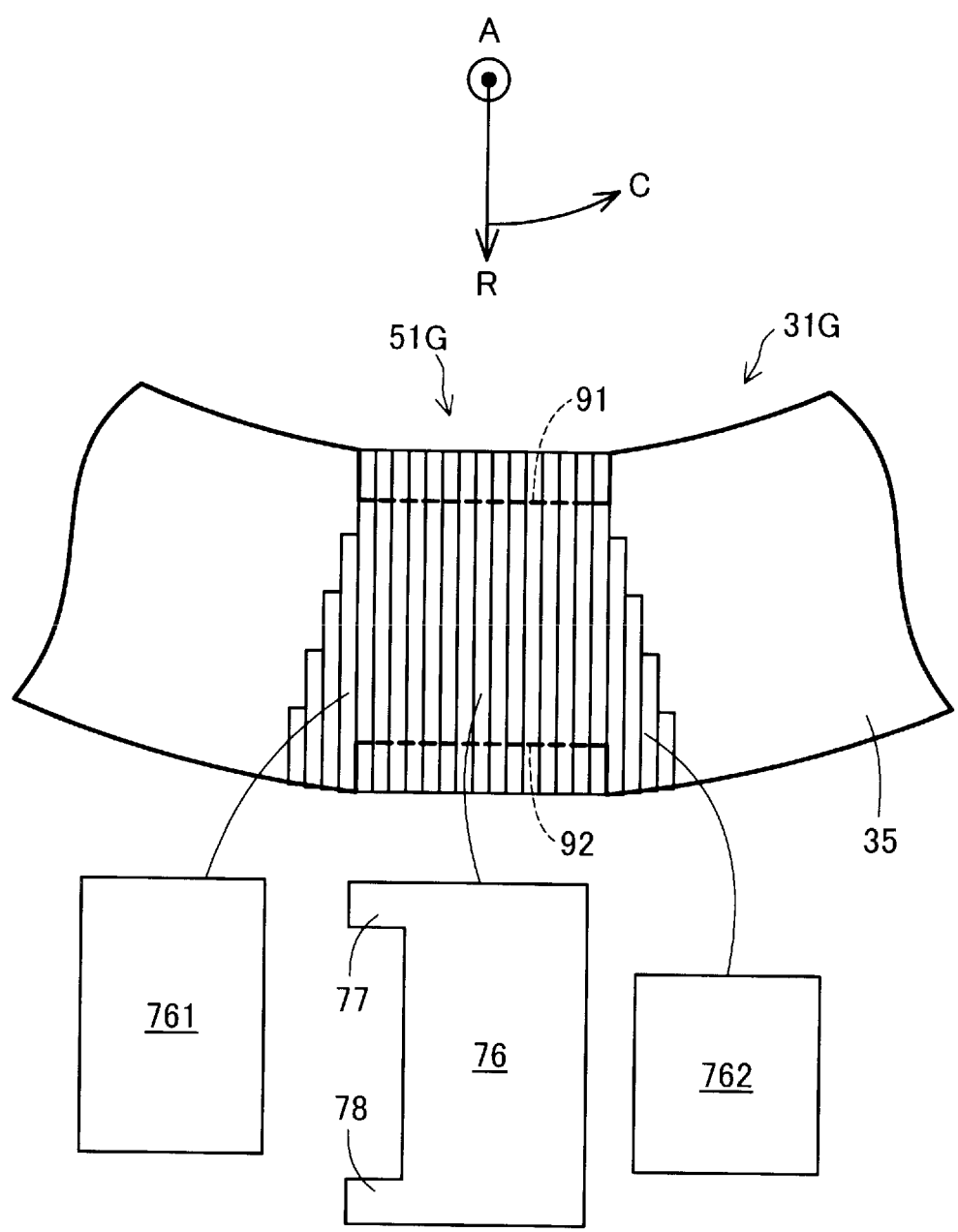
FIG. 16 is an explanatory diagram showing a configuration of a stator of another embodiment.

(9) Another Embodiment 7:

FIG. 16 shows a configuration of a stator 31G of the other embodiment 7. The stator 31G has a configuration in which cores 51G are attached to the yoke 35 having the same shape as that of the second embodiment. The core 51G has a trapezoidal plan view shape. That is, the core 51G of the other embodiment 7 has a configuration in which pluralities of electrical steel sheets 761, 762 or the like having gradually decreasing widths are stacked on both sides of the stacked same electrical steel sheets 76 as those of the core 51F of the second embodiment. In this embodiment, the pluralities of electrical steel sheets 761, 762 or the like having the gradually decreasing widths are welded to the electrical steel sheets 76 and integrated.

In the stator 31G of the embodiment 7, regarding the attachment to the yoke 35, the same function and effect as those of the stator 31F of the second embodiment may be exerted, the area of the core 51G in the plan view may be increased, and the magnetic force by energization of the coil (not shown) provided in the core 51G may be increased. In the example shown in FIG. 16, the attachment portion 91 and the attachment portion 92 at the yoke 35 side have the same length in the circumferential direction, however, the length of the attachment portion 92 in the circumferential direction may be made longer and the fitting portion 78 may be formed on one side of the electrical steel sheets 761, 762 or the like and fitted into the attachment portion 92. In this case, the fixation of the core 51G is stronger.

Figure 17:
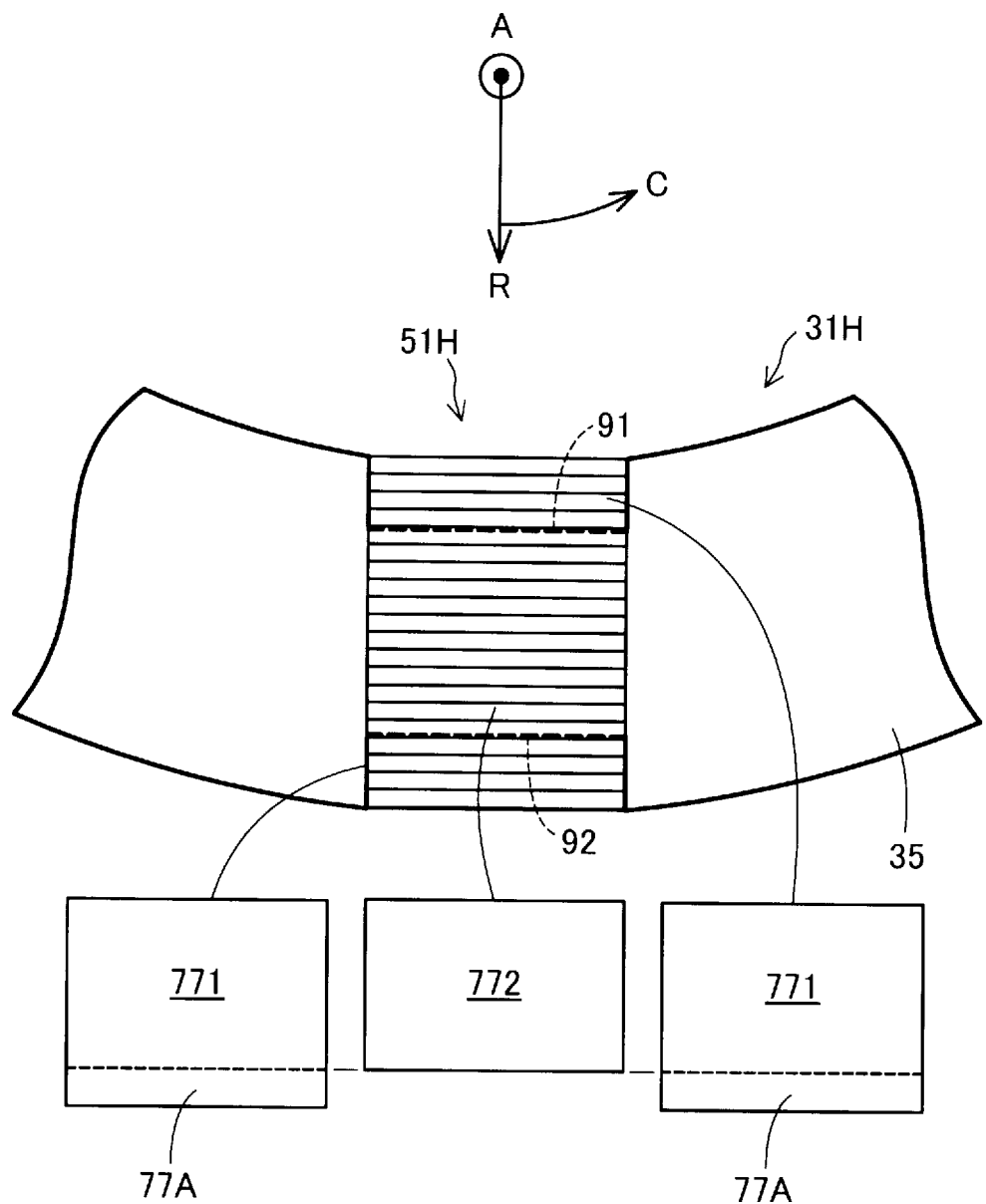
FIG. 17 is an explanatory diagram showing a configuration of a stator of yet another embodiment.

(10) Another Embodiment 8:

FIG. 17 shows a main part of a stator 31H of yet another embodiment 8. This stator 31H includes the yoke 35 having the attachment portions 91, 92 in the same forms as those of the second embodiment and the other embodiment 7 with cores 51H. In the core 51H, the stacking direction of the electrical steel sheets is the radial direction R of the yoke 35 different from those of the second embodiment and the other embodiment 7. The core 51H is formed by stacking of two types of rectangular electrical steel sheets having different heights. That is, the core 51H has a configuration in which a plurality of electrical steel sheets 772 are stacked and, on both sides thereof, pluralities of electrical steel sheets 771 having larger heights than the electrical steel sheets 772 are respectively stacked. The electrical steel sheets 771, 772 have upper sides at the same level, and the lower ends of the electrical steel sheets 771 respectively project below the core 51H and form fitting portions 77A. The fitting portions 77A are fitted into the attachment portions 91, 92, and thereby, the core 51H is attached to the yoke 35.

Also, in the embodiment 8, like the second embodiment and the other embodiment 7, the core 51H is attached to the yoke 35 in a plurality of locations and exhibits higher strength against the shear force.

Figure 18:
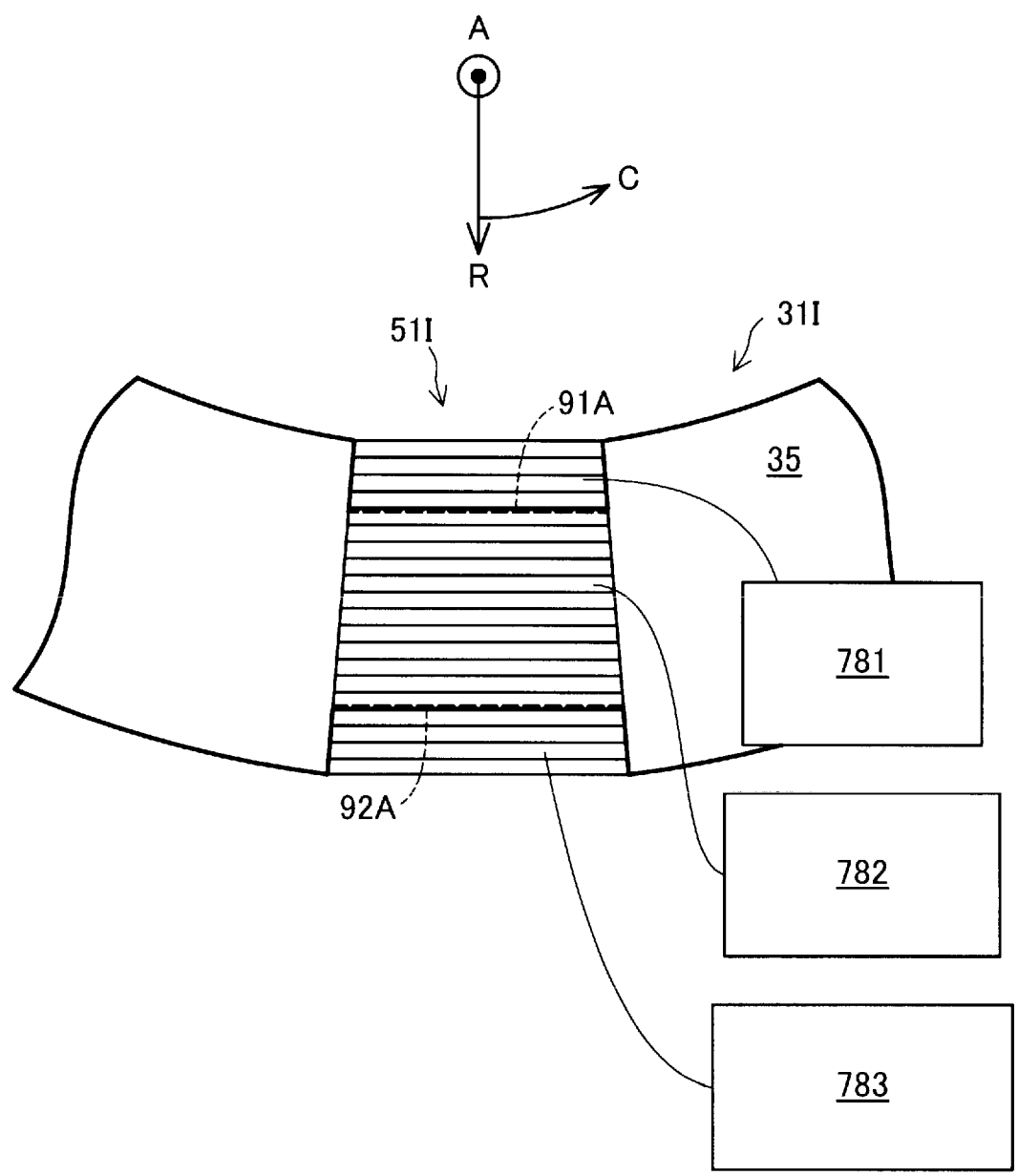
FIG. 18 is an explanatory diagram showing a configuration of a stator of yet another embodiment.

(11) Another Embodiment 9:

FIG. 18 shows a configuration of a stator 31I of the embodiment 9 similar to the other embodiment 8. In this embodiment 9, a core 51I forming the stator 31I has a trapezoidal plan view shape. Accordingly, all of stacked electrical steel sheets have different sizes from one another. The electrical steel sheets 781 forming fitting portions and having larger heights than electrical steel sheets 782 are stacked in the end portion of the inner circumference side of the yoke 35 of the electrical steel sheets 782 stacked in the center portion. Further, the electrical steel sheets 783 forming fitting portions and having larger heights than the electrical steel sheets 782 are stacked in the end portion of the outer circumference side of the yoke 35 of the stacked electrical steel sheets 782. All electrical steel sheets have shapes with lengths along the circumferential direction C of the yoke 35 gradually increasing from the inner circumference side toward the outer circumference side of the yoke 35.

Therefore, regarding attachment portions 91A, 92A provided in the yoke 35, the lengths of the attachment portions 92A at the outside in the radial direction, i.e., at the outer circumference side in the circumferential direction C are longer than the lengths of the attachment portions 91A at the inside in the radial direction, i.e., at the inner circumference side. In the stator 31I having the configuration, the same function and effect as those of the other embodiment 8 may be exerted and the area of the core 51I in the plan view may be increased, and the output in the axial gap motor 20 may be increased.

Figure 19:
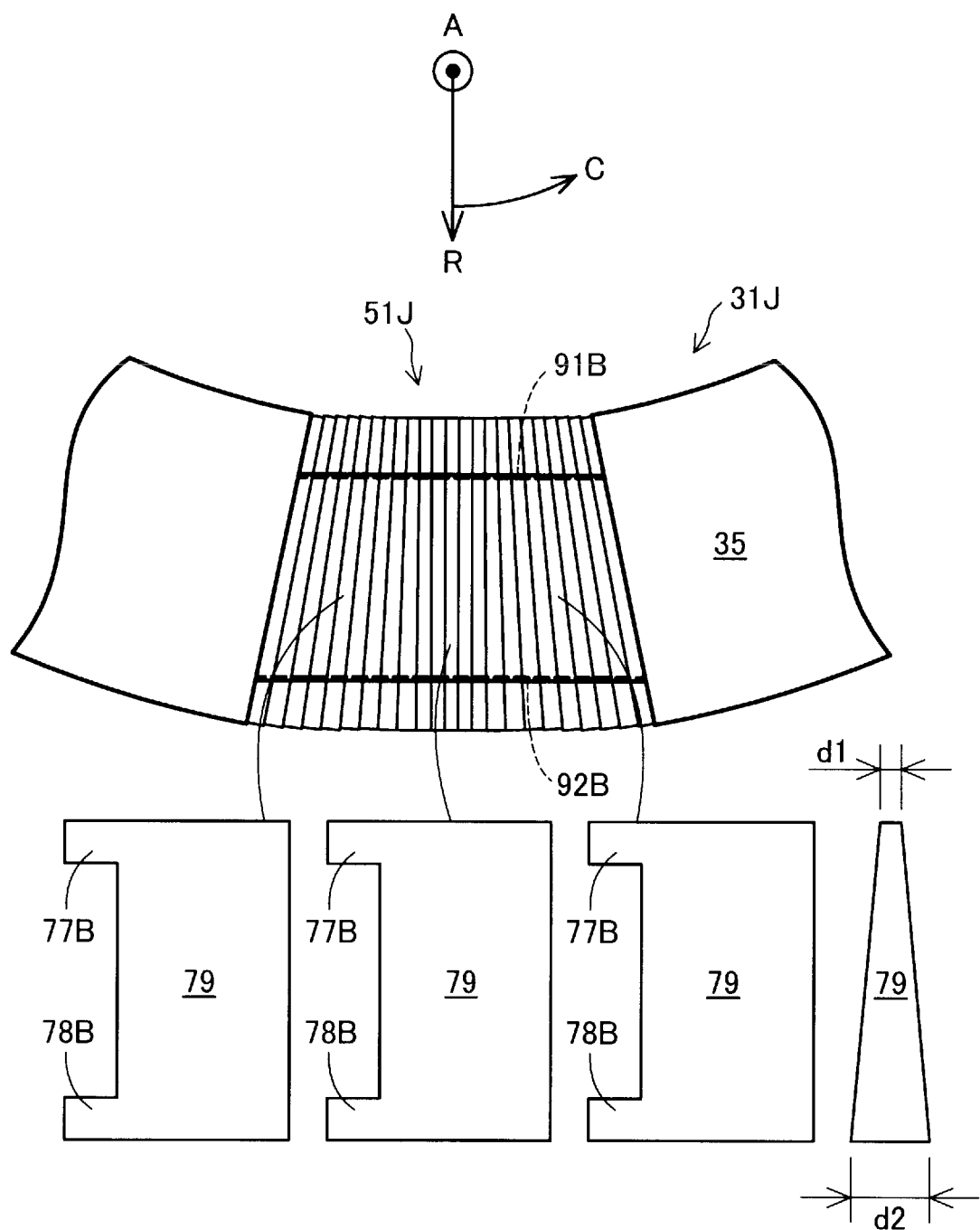
FIG. 19 is an explanatory diagram showing a configuration of a stator of yet another embodiment.

(12) Another Embodiment 10:

Next, a configuration of a stator 31J of the other embodiment 10 will be explained using FIG. 19. In the embodiment 10, as a core 51J forming the stator 31J, a core substantially in a trapezoidal shape in the plan view is realized by stacking of electrical steel sheets having the same shape along the circumferential direction C. In the yoke 35, an attachment portion 92B at the outer circumference side has a shape with a length longer along the circumferential direction C than that of an attachment portion 91B at the inner circumference side like that in the other embodiment 9.

On the other hand, all electrical steel sheets 79 forming the core 51J have the same shape. That is, the electrical steel sheets 79 have fitting portions 77B, 78B on both ends and are stacked and attached to the yoke 35. As shown at the right end in the lower part of FIG. 19, the electrical steel sheet 79 has a thickness d1 at the inner circumference side formed to be smaller than a thickness d2 at the outer circumference side. Accordingly, when the plurality of electrical steel sheets 79 are stacked, the plan view shape of the core 51J is a trapezoidal shape as a whole. In this state, the relationship between the fitting portions 77B, 78B of the core 51J and the attachment portions 91B, 92B of the yoke 35 is the same as that of the other embodiment 9 shown in FIG. 18, however, the embodiment is advantageous in that all of the electrical steel sheets 79 have the same shape and all of the electrical steel sheets 79 are fitted into the attachment portions 91B, 92B in the fitting portions 77B, 78B and contribute to increase in strength.

When the electrical steel sheets 79 having the shapes are used, the sheets can be stacked so that both the outer circumference side and the inner circumference side may be parts of arcs. In this case, the fitting portions 77B, 78B also form arc shapes, and the attachment portions 91B, 92B may be formed in arc shapes. Note that the electrical steel sheets 79 having the different thicknesses between the inner circumference side and the outer circumference side may be easily manufactured by being passed through rollers with different loads in the roller axial direction before cutting of the electrical steel sheets by pressing.

As above, various embodiments of the second aspect are explained, however, the embodiments of the second aspect are not limited to those. In the above described respective embodiment, the attachment portions 91, 92 are provided as concave portions at the innermost circumference and the outermost circumference of the yoke 35, however, may be provided as opening portions at the inner sides of the yoke than the innermost circumference position and the outermost circumference position of the yoke 35. In this case, in the electrical steel sheets forming the core 51F, the fitting portions 77, 78 or the like may be provided, not on both ends of the core 51F, but in positions at the inner sides of the ends and the core 51F may be formed by stacking of the electrical steel sheets like the electrical steel sheets 723 shown in FIG. 8. Further, the number of attachment portions may be more than two, e.g. three or more. In a case of three, a new attachment portion may be provided between the attachment portions 91, 92 and a fitting portion may be additionally provided in a corresponding portion of the core. Further, the fitting portion may be formed by post-processing of a rectangular parallelepiped core formed by stacking of rectangular electrical steel sheets having the same shape. At the post-processing, the stacked electrical steel sheets may be processed by being fixed by a jig or the like. In this case, the degree of freedom of the shapes and arrangement of the fitting portions is higher.

C. Other Aspects

The above described first aspect and second aspect correspond to the difference in placement direction of the attachment portions. However, the distinction is for convenience and, for example, the attachment portions 81, 82 in the first aspect may be placed at tilts e.g. 45 degrees relative to the direction along the radial direction R of the yoke 35. Or, the attachment portions 85, 86 shown in FIG. 6C may be formed substantially as circular or rectangular opening portions and placed with shift in the radial direction, and fitting portions conforming with the attachment portions may be formed at the core side. The respective shapes of the plurality of fitting portions are not limited to the rectangular shapes, but may be T-shapes, cross-shapes, H-shapes, or arc shapes. The respective shapes of the plurality of fitting portions may be different from one another. These apply to the attachment portions.

The cores used in the above described respective embodiments include the cores formed by stacking of electrical steel sheets having the same shape and the cores formed by stacking of electrical steel sheets having the different shapes. The former requires only one type of electrical steel sheets and is easily manufactured. On the other hand, the latter has the higher degree of freedom of shape because the electrical steel sheets having the plurality of types of shapes are combined. Note that, with respect to the thickness and material, only a single type of electrical steel sheets may be used or two or more types of electrical steel sheets may be mixed for formation of the core.

Figure 20:
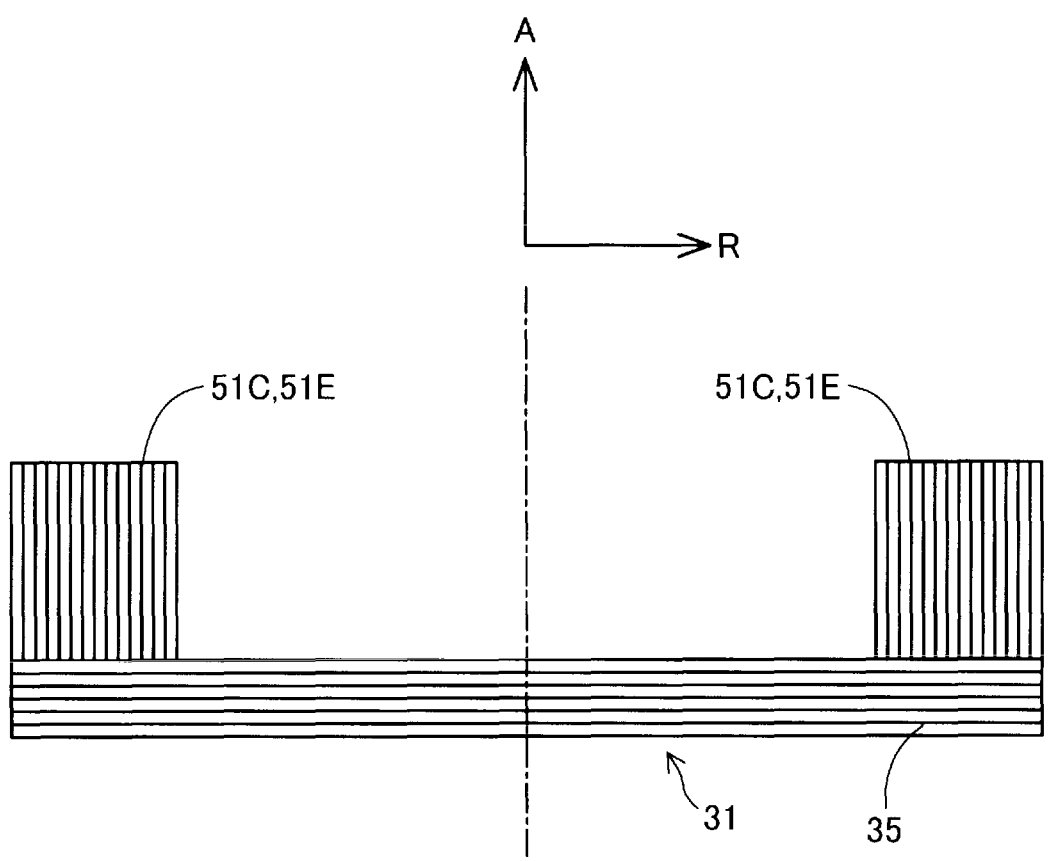
FIG. 20 is an explanatory diagram exemplifying stacking directions of electrical steel sheets of a yoke and cores.

In the above described axial gap motor 20, both the cores and the yokes forming the respective stators are formed using the electrical steel sheets, however, the electrical steel sheets in the cores and yokes may be stacked in any directions. As shown in FIG. 20, the staking direction of the electrical steel sheets in the yoke 35 may be a direction along the axial direction A of the axial gap motor 20. This stacking direction is preferable because of the direction of the magnetic flus passing through the yoke 35 and ease of formation of the yoke 35. On the other hand, the stacking direction of the electrical steel sheets forming the core is preferably another direction than the direction along the axial direction A.

Figure 21:
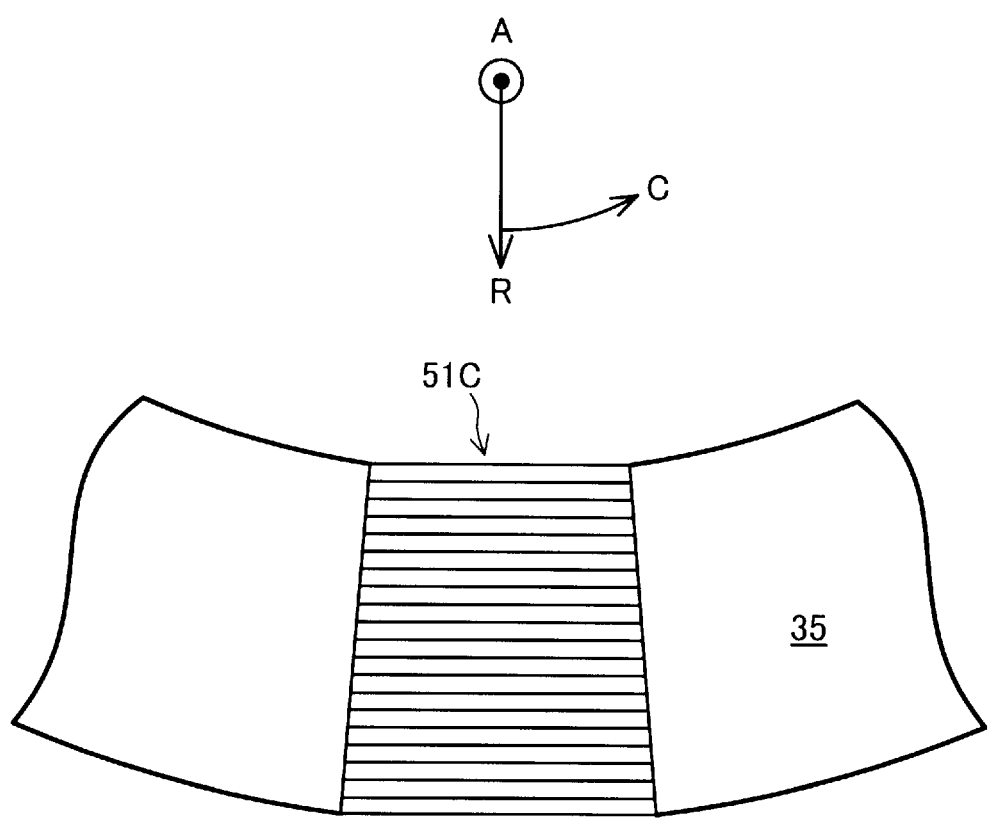
FIG. 21 is an explanatory diagram showing a case where electrical steel sheets are stacked along a radial direction.
Figure 22:
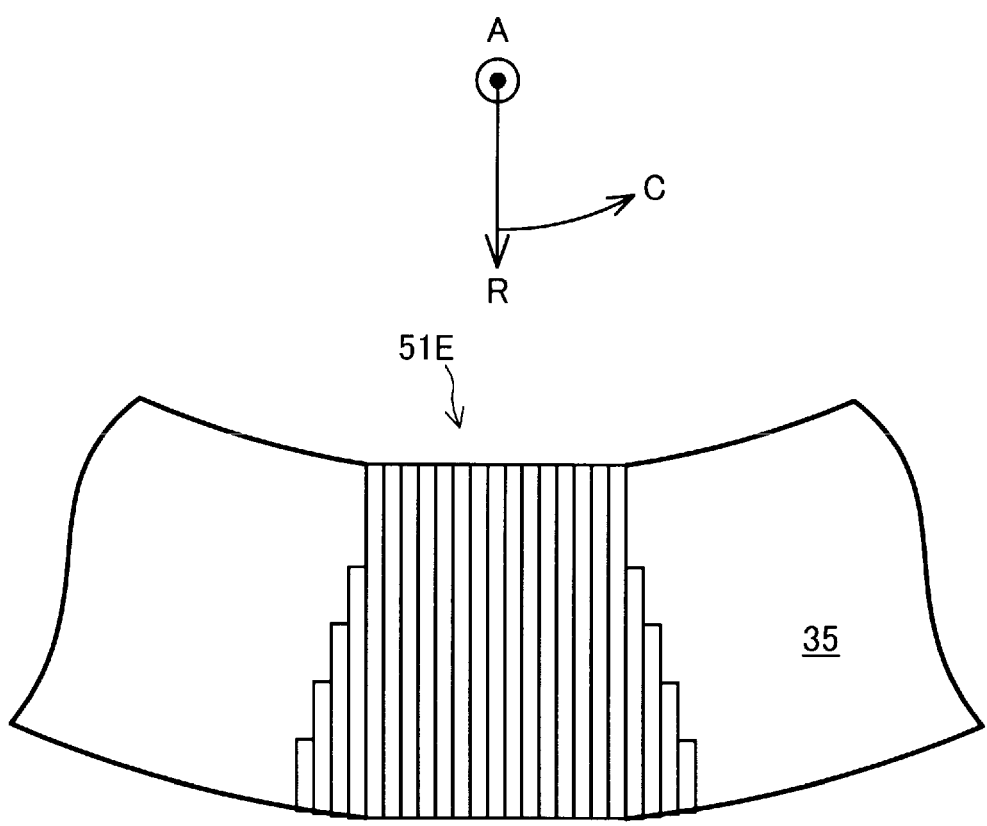
FIG. 22 is an explanatory diagram showing a case where electrical steel sheets are stacked along a circumferential direction.

FIGS. 21 and 22 show representative stacking directions using the core 51C and the core 51E. In the core 51C exemplified in FIG. 21, the electrical steel sheets are stacked in the direction along the radial direction R. Further, in the core 51E exemplified in FIG. 22, the electrical steel sheets are stacked in the direction along the circumferential direction C. In both of the stacking directions shown in FIGS. 21 and 22, the magnetic flux formed by the coils 61 easily passes through the cores 51C, 51E and the loss due to eddy current is smaller.

D. Method of Manufacturing Axial Gap Motor:

A method of manufacturing the axial gap motor 20 will be briefly explained. The axial gap motor 20 is generally manufactured as a motor including M-phase winding wires (M is an odd number equal to or more than three). In a case of a 3-phase 4-pole axial gap motor 20, the number of cores is twelve and the manufacturing process of the axial gap motor 20 is as follows.

[1] a step T1 of forming the cores 51 or the like to be attached to the yoke 35, which include the pluralities of fitting portions 72, 73 or the like in the different positions at the opposite side to the yoke 35, by stacking of thin plates that can be penetrated by magnetic flux, e.g. the electrical steel sheets 71

[2] a step T2 of preparing at least twelve of the cores 51 or the like

[3] a step T3 of preparing the yoke 35 having the pluralities of attachment portions 81, 82 or the like in correspondence to the pluralities of fitting portions 72, 73 or the like in the respective positions in which the twelve cores 51 or the like are to be fixed

[4] a step T4 of assembling the stator 31 or the like having the yoke 35 and the cores 51 or the like by fitting the respective fitting portions 72, 73 of the twelve cores 51 or the like into the attachment portions 81, 82 or the like of the yoke 35

[5] a step T5 of attaching the field coils 61 to the respective twelve cores 51 or the like before or after the assembly of the stator 31 or the like

[6] a step 16 of assembling the rotatably supported rotor 40 and the stator 31 or the like in the positions in which the end surfaces of the cores 51 or the like at the opposite side to the yoke 35 are placed with the gaps at predetermined distances in the direction parallel to the rotation shaft A with respect to the rotor 40

In the above described process, the axial gap motor 20 is manufactured. Note that the steps T1, T2 may be performed simultaneously or the order of the steps may be reversed.

According to the manufacturing method, the axial gap motor 20 that can bear the shear force generated when the reaction force of the output torque of the motor along the circumferential direction of the yoke 35 due to energization to the coil is applied to the cores 51 or the like may be easily manufactured.

The present disclosure is not limited to the above described embodiments, but may be realized in various configurations without departing from the scope thereof. For example, a single-stator structure including a stator at one side in the axial direction of the rotor may be employed. Further, the shaft may be fixed, the places of the rotor and the stator may be exchanged, and an outer may be rotated about the fixed shaft. Furthermore, technical features in the embodiments corresponding to the technical features of the respective aspects described in SUMMARY can be appropriately replaced or combined for solving part or all of the above described problems or achieving part or all of the above described effects. Unless the technical features are described as essential features in this specification, the technical features can be appropriately deleted.

What is claimed is:

1. An axial gap motor comprising:
a rotating rotor; and
a stator placed to face the rotor with a gap in a first direction parallel to a shaft of the rotation, wherein
the stator has a core in which a plurality of thin plates penetrated by magnetic flux are stacked along a second direction which is a circumferential direction of an annular yoke, and the yoke having the core, and
a plurality of fitting portions of the core are fitted into a plurality of attachment portions of the yoke,
wherein a thickness of each of the plurality of thin plates is larger in an end portion at an outer circumference side of the yoke than in an end portion at an inner circumference side of the yoke.

2. The axial gap motor according to claim 1, wherein
the plurality of fitting portions are disposed relative to each other in a circumferential direction of the yoke.

3. The axial gap motor according to claim 1, wherein
the plurality of fitting portions are disposed relative to each other in a radial direction of the yoke.

4. The axial gap motor according to claim 1, wherein
the plurality of thin plates having the same shape are stacked in the core.

5. The axial gap motor according to claim 1, wherein
the plurality of thin plates having different shapes are stacked in the core.

6. The axial gap motor according to claim 1, wherein
the thin plates are electrical steel sheets including insulating coatings on surfaces thereof, and
a length of the core in a circumferential direction of the yoke is larger in an end portion at an outside in a radial direction of the yoke than in an end portion at an inside in the radial direction of the yoke.

* * * * *